US006696175B2

(12) United States Patent
Palmer et al.

(10) Patent No.: US 6,696,175 B2
(45) Date of Patent: Feb. 24, 2004

(54) UNRECRYSTALLIZED LAYER AND ASSOCIATED ALLOYS AND METHODS

(75) Inventors: Scott L. Palmer, Parkersburg, WV (US); Zayna Connor, Ripley, WV (US); H. Scott Goodrich, Millwood, WV (US)

(73) Assignee: Pechiney Rolled Products, Ravenswood, WV (US)

( * ) Notice: Subject to any disclaimer, the term of this patent is extended or adjusted under 35 U.S.C. 154(b) by 0 days.

(21) Appl. No.: 10/345,336

(22) Filed: Jan. 16, 2003

(65) Prior Publication Data

US 2003/0162051 A1 Aug. 28, 2003

Related U.S. Application Data

(60) Provisional application No. 60/349,255, filed on Jan. 18, 2002.

(51) Int. Cl.[7] .......................... B32B 15/20; B32B 31/00; C22F 1/04
(52) U.S. Cl. .................. 428/654; 148/523; 148/535; 148/549; 148/552; 148/691; 148/692; 148/693; 148/698; 148/699; 148/700; 148/415; 148/416; 148/417; 148/418; 148/437; 148/438; 148/439; 428/636; 428/925; 428/926
(58) Field of Search ....................... 428/654, 636, 428/925, 926; 148/523, 535, 549, 552, 691, 692, 693, 698, 699, 700, 415, 416, 417, 418, 437, 438, 439

(56) References Cited

U.S. PATENT DOCUMENTS 5,061,327 A * 10/1991 Denzer et al. .............. 148/439

* cited by examiner

Primary Examiner—Robert R. Koehler
(74) Attorney, Agent, or Firm—Connolly Bove Lodge & Hutz LLP

(57) ABSTRACT

The present invention provides aluminum alloys and layers formed in aluminum alloys as well as methods for their manufacture. Aluminum alloys of the present invention are provided with at least one discrete layer of uncrystallized grains formed therein. Alloys of the present invention can be formed, for example, by a process that includes a final partial anneal that permits softening of the material to essentially an O-temper condition. Processes of the present invention recrystallized substantially the entire material by leave a discrete layer of preferably less than 50 microns of the material unrecrystallized. In preferred embodiments, the aluminum material is a core material that is clad on one or both sides and the discrete unrecrystallized layer forms at the boundary between the clad and the core.

22 Claims, 34 Drawing Sheets

100X
HF ETCH

100X
HF ETCH

500X
PRE-BRAZE (O-TEMPER) MICROSTRUCTURE

L
BARKER'S ETCH, 100X

T
PRE-BRAZE (O-TEMPER) GRAIN STRUCTURE

0% STRETCH
HF ETCH, 100X 2.5% STRETCH
POST-BRAZE MICROSTRUCTURE

5% STRETCH
HF ETCH, 100X 7.5% STRETCH

10% STRETCH

0% STRETCH
BARKER'S ETCH, 100X 2.5% STRETCH
POST-BRAZE GRAIN STRUCTURE

5% STRETCH
BARKER'S ETCH, 100X 7.5% STRETCH

10% STRETCH

312 HRS
HF ETCH, 100X

288 HRS
SWAAT CORROSION DAMAGE (0% STRETCH)

312 HRS
HF ETCH, 100X

288 HRS

360 HRS
HF ETCH, 100X

360 HRS
SWAAT CORROSION DAMAGE (2.5% STRETCH)

312 HRS
HF ETCH, 100X

312 HRS
SWAAT CORROSION DAMAGE (5% STRETCH)

288 HRS
HF ETCH, 100X

288 HRS
SWAAT CORROSION DAMAGE (7.5% STRETCH)

288 HRS
HF ETCH, 100X

312 HRS
SWAAT CORROSION DAMAGE (10% STRETCH)

L
BARKER'S ETCH, 100 X

T
PRE-BRAZE GRAIN STRUCTURE (O-TEMPER: 700 F/2HRS, 0.019")

SWAAT RESULTS FOR TWO DIFFERENT CLAD SIDE EXPOSURES

| CLAD SIDE EXPOSED TO SWAAT | SPECIMEN # | SWAAT HOURS | | | OVERALL AVERAGE |
|---|---|---|---|---|---|
| | | A SIDE | B SIDE | AVERAGE | |
| WITH Zn (K474 SIDE) CA70 "O" TEMPER POST BRAZE | 1 | 840 | 840 | 840 | 826 |
| | 2 | 720 | 840 | 780 | |
| | 3 | 840 | 840 | 840 | STD. DEV.=23 |
| | 4 | 840 | 840 | 840 | |
| | 5 | 816 | 840 | 828 | |
| | 6 | 840 | 816 | 828 | |
| WITHOUT Zn (4045 SIDE) CA70 "O" TEMPER POST BRAZE | 1 | 816 | 816 | 816 | 824 |
| | 2 | 840 | 840 | 840 | |
| | 3 | 840 | 792 | 816 | STD. DEV.=20 |
| | 4 | 840 | 840 | 840 | |
| | 5 | 840 | 840 | 840 | |
| | 6 | 768 | 816 | 792 | |
| CA15-H24 POST BRAZE (CONTROL) | 1 | 840+ | 840+ | 840+ | 840+ |
| | 2 | 840+ | 840+ | 840+ | |

+ TEST TERMINATED WITHOUT FAILURE

*FIG. 14*

TENSILE PROPERTIES

| SPECIMEN # | PRE-BRAZE (AS-RECEIVED) | | | POST-BRAZE | | |
|---|---|---|---|---|---|---|
| | YS,ksi (MPa) | UTS,ksi (MPa) | % ELONG. | YS,ksi (MPa) | UTS,ksi (MPa) | % ELONG. |
| 1 | 10.36 (71.4) | 20.91 (144.1) | 21.3 | 9.73 (67.1) | 20.66 (142.5) | 20.2 |
| 2 | 9.09 (62.7) | 20.88 (144.0) | 22.6 | 9.08 (62.6) | 20.73 (142.9) | 18.8 |
| 3 | 11.03 (76.1) | 20.79 (143.3) | 22.6 | 10.04 (69.2) | 20.67 (142.5) | 18.7 |
| 4 | 9.94 (68.5) | 20.80 (143.4) | 23.4 | 10.24 (70.6) | 20.77 (143.2) | 17.6 |
| MEAN | 10.11 (69.7) | 20.85 (143.7) | 22.5 | 9.77 (67.4) | 20.71 (142.8) | 18.8 |

*FIG. 15*

EFFECT OF PRIOR
COLD WORK ON BRAZE FLOW AND CORE EROSION

| 0% STRETCH | % BRAZE FLOW | % CORE EROSION |
|---|---|---|
| 0 | 55 | 0 |
| 2.5 | 50 | 0 |
| 5 | 47 | 0 |
| 7.5 | 46 | 0 |
| 10 | 55 | 0 |

PRE AND POST BRAZE TENSILE FOR CA15

*FIG. 16*

0% STRETCH
HF ETCH, 100 X 2.5% STRETCH
POST-BRAZE MICROSTRUCTURE (CA70-O, LOT # 982701)

5% STRETCH
HF ETCH, 100 X 7.5% STRETCH

10% STRETCH

HF ETCH, 100 X

MICROPROBE CONCENTRATION PROFILE ACROSS
A FULLY MELTED 300S BRAZE SECTION

| ZONE | *DIST(cm) | Mg | Si | Mn | Cu | Zn | Fe |
|---|---|---|---|---|---|---|---|
| MELTED CLADDING | 10 | 0.10 | 1.46 | 0.09 | 0.11 | 0 | 0.25 |
| MELTED CLADDING | 30 | 0.19 | 1.52 | 0.07 | 0.20 | 0 | 0.25 |
| LFM ZONE | 40 | 0.07 | 1.63 | 0.10 | 0.03 | 0 | 0.18 |
| LFM ZONE | 55 | 0.08 | 1.75 | 0.10 | 0.05 | 0 | 0.18 |
| LFM ZONE | 70 | 0.08 | 1.75 | 0.12 | 0.04 | 0.03 | 0.18 |
| CORE | 85 | 0.31 | 0.65 | 0.78 | 0.28 | 0.05 | 0.42 |

* DISTANCE MEASURED FROM POST-BRAZE SURFACE

FIG. 20
*PRIOR ART*

HEAVY CORE DISSOLUTION IN LOW PREHEAT 3003 TYPE BRAZING SHEET

-O TEMPER

HEAVY CORE DISSOLUTION IN LOW PREHEAT 3003 TYPE BRAZING SHEET

2.5% STRETCH

HEAVY CORE DISSOLUTION IN LOW PREHEAT 3003 TYPE BRAZING SHEET

7.5% STRETCH

HEAVY CORE DISSOLUTION IN LOW PREHEAT
3003 TYPE BRAZING SHEET

10% STRETCH 0.25% HF ETCH

HEAVY CORE DISSOLUTION IN LOW PREHEAT
3003 TYPE BRAZING SHEET

15% STRETCH

X100

PROGRESSIVE CLAD MELTING AND INITIATION OF LFM

PROGRESSIVE CLAD MELTING AND INITIATION OF LFM

PROGRESSIVE CLAD MELTING AND INITIATION OF LFM

PROGRESSIVE CLAD MELTING AND INITIATION OF LFM

PROGRESSIVE CLAD MELTING AND INITIATION OF LFM

ELEMENT MAPS IN LFM EUTECTIC

B.S.E.

ELEMENT MAPS IN LFM EUTECTIC

Si

ELEMENT MAPS IN LFM EUTECTIC

Mn

ELEMENT MAPS IN LFM EUTECTIC

Fe

LFM EFFECTS IN A BRAZED AND CORRODED EVAPORATOR
SWAAT ATTACK

LFM EFFECTS IN A BRAZED AND CORRODED EVAPORATOR
VARIABLE METAL FLOW

UNRECRYSTALLIZED LAYER AND ASSOCIATED ALLOYS AND METHODS

CLAIM FOR PRIORITY

This application claims priority under 35 U.S.C. §119 (e) from U.S. Ser. No. 60/349,255 filed Jan. 18, 2002, the content of which is hereby incorporated by reference in its entirety.

BACKGROUND OF THE INVENTION

1. Field of the Invention

The present invention relates generally to aluminum alloys as well as to materials and methods that include aluminum alloys. It is most particularly adapted to aluminum brazing sheet materials suitable for use as evaporator plates, but it is also adaptable to other aluminum alloys.

2. Description of Related Art

The precipitation characteristics of aluminum alloys must be considered frequently during evaluation of materials for particular uses. This is because the presence or absence of such precipitates in aluminum materials greatly affects the ability of the alloy to withstand exposure to extreme temperatures, chemicals and/or impact over the long and short term. Evaluating the presence (or absence) of particular precipitates is also necessary for determining standard practices for downstream manufacturing operations (such as hot forming and straightening, adhesive bonding, painting and dry-film lubricant curing). The state of precipitation that exists in an alloy at the time of reheating plays a significant role in the effects of reheating or annealing.

Annealing treatments employed for aluminum alloys are generally selected based on the alloy type as well as on the initial structure and temper. Depending on the final properties desired, it is possible to subject a material to either a full anneal, a partial anneal, or what is known as a stress-relief anneal. The softest, most ductile and most workable condition of both non-heat-treatable and heat-treatable wrought alloys is produced by a full anneal to the temper designated "O." Aluminum sheet products that have been cold worked and then annealed to the O temper are generally recrystallized.

When articles comprising aluminum alloy sheets with a core and a cladding of aluminum brazing alloy are being formed, the assembly of shaped parts is brazed by subjecting the assembly to a temperature above the melting point of the cladding and below the melting point of the core metal. Any substantial coarsening of the metal grains that is brought about at the elevated temperature necessary to effect the brazing, tends to encourage penetration of the molten brazing alloy through the core and cause weakening and ultimate failure of the assembly. This problem is disclosed in U.S. Pat. No. 3,966,506, ["the '506 patent"] the content of which is incorporated herein by reference. Brazing sheet materials are generally comprised of multiple layers. See, e.g. U.S. Pat. No. 5,292,595 that discloses a 3-layered clad material. In addition, materials such as A3005 and A3003 have been used as the core material and a clad layer of another aluminum alloy such as A7072 or A4343. Typically, the aluminum alloy brazing stock material comprises a core that has been clad on one or both sides with an aluminum based alloy. The composition of the core and the clad are carefully selected and are important in the properties of the resulting brazing sheet material.

Substantial problems exist with corrosion from both the interior and exterior of the tube. Particularly, problems arise in the interior of the tube due to erosion/corrosion which develops due to the extremely fast velocity of coolant that is moving through the interior of the tubes. The coolant traveling at high pressures and velocities will cause erosion. (The phenomenon of internal corrosion/erosion is not to be confused with core erosion or liquid film migration (LFM), which occurs during the brazing process. For clarification, internal corrosion/erosion describes the corrosion/erosion of the interior of the article. Internal corrosion/erosion occurs when the inner surfaces are exposed to the coolant traveling at high velocity. External corrosion describes the corrosion of the exterior of the article. External corrosion occurs when the external surfaces are exposed to abrasive/corrosive materials such as road salt, humidity in the air etc. Core erosion or LFM, which occurs during the brazing process, is the phenomenon whereby the clad material penetrates the core material resulting in "erosion" of the core.)

One problem with recrystallized materials lies with their susceptibility to core erosion during brazing. While recrystallization is desirable in order to make the material softer and more formable, core erosion resistance of such recrystallized materials is typically insufficient. Poor core erosion resistance is not acceptable for brazed materials since corrosion/erosion resistance is extremely important for the end use products that will be formed. Core erosion during brazing will result in a material much less resistant to corrosion/erosion and a material with much less strength. While the '506 patent describes methods for forming materials that are said to retain some unrecrystallized grain fragments dispersed among the recrystallized grains in a metal sheet in order to prevent or minimize grain coarsening when the shaped sheet is heated to an elevated temperature, no substantial benefit in terms of core erosion resistance of such materials is taught. Moreover, the core material of the '506 patent will also lack the formability properties of recrystallized materials.

As such, the provision of a material that is useful as core material in brazed sheets (such as those used to manufacture evaporator plate) as well as other applications where both satisfactory formability and core erosion resistance during brazing are necessary would be highly desirable. It would also be desirable in the industry to obtain a product which is not susceptible to core erosion or LFM during brazing, and has the additional benefit of greater strength, better fatigue resistance, and improved erosion/corrosion resistance during operational use of the product. In particular, a true long-life evaporator alloy has never before been made, and such an alloy would be capable of meeting this very important market need.

SUMMARY OF THE INVENTION

In accordance with these and other objects, the present invention provides aluminum alloys and layers formed in aluminum alloys as well as methods for their manufacture. Aluminum alloys of the present invention are provided with at least one discrete and a substantially continuous layer of uncrystallized grains abutting the surface of the core sheet, which can be clad or not.

Materials of the present invention can be formed, for example, by a process that includes a final anneal that permits softening of the material. Processes of the present invention substantially recrystallize the material but leave a discrete and substantially continuous layer abutting the surface roughly up to 20%, preferentially less than 5% by volume of the material unrecrystallized. In preferred embodiments, the aluminum material is a core material that is clad on one or both sides and the discrete uncrystallized layer forms at the boundary between the clad and the core.

Additional objects, features and advantages of the invention will be set forth in the description which follows, and in part, will be obvious from the description, or may be learned by practice of the invention. The objects, features and advantages of the invention may be realized and obtained by means of the instrumentalities and combination particularly pointed out in the appended claims.

BRIEF DESCRIPTION OF THE DRAWINGS

FIG. 14 is a table showing the SWAAT results for two different clad side exposures, one where Zn is included, and one without Zn.

FIG. 15 is a table showing tensile properties of materials of the present invention.

FIG. 16 shows results in terms of % stretch vs. % braze flow for a material according to the present invention.

FIG. 20 is a table giving results of a prior art material with A3005.

The accompanying drawings, which are incorporated in and constitute a part of the specification, illustrate a presently preferred embodiment of the invention, and, together with the general description given above and the detailed description of the preferred embodiment given below, serve to explain the principles of the invention.

DETAILED DESCRIPTION OF THE PREFERRED EMBODIMENT

Alloys of the present invention can be formed, for example, by a process that includes a final partial anneal that permits softening of the material. Processes of the present invention recrystallize substantially the entire material but leave a discrete layer of up to about 20%, preferably less than 5% by volume of the material unrecrystallized. To achieve the desired property balance, this layer is preferably both continuous—thereby ensuring sufficient core erosion resistance—and not too thick, in order to meet O-temper type formability requirements. Preferably the unrecrystallized layer is continuous and the pancake-shaped grains that are present in the layer abut one another or even overlap.

In preferred embodiments, the aluminum material is a core material that is clad on one or both sides and the discrete uncrystallized layer ["URL"] forms at the boundary between the clad and the core. The discrete layer can be continuous in some embodiments. In other embodiments, the layer can vary to some degree in thickness and presence, and in such embodiments the unrecrystallized layer may be substantially continuous. By substantially continuous, it is intended that at least 80% of the surface be provided with some degree of unrecrystallization, preferably at least 85%. In substantially continuous layers, it is possible that the gaps in the layer may be numerous or be scarce. That is, there could be just a single gap that accounts for perhaps 10% of the surface, or else, there could be hundreds of gaps that when added together account for say, 10% of the surface. In either case, the layer is still considered substantially continuous. Note that to the extent that any degree of presence of unrecrystallized material is present in an amount sufficient to affect the properties of materials prepared therewith, such a material is considered within the scope of the present invention.

The presence of the pancake-shaped elongated grains of the unrecrystallized portion or layer impedes or even stops the growth of erosion due to the more tortuous path, and hence higher energy necessary to migrate around the grain boundary. This fact makes clad and unclad alloys of the present invention particularly adaptable to applications where corrosion/erosion properties are important as well as fatigue strength and longer fatigue life. As such, there are preferably enough pancake-shaped grains present to positively affect the corrosion/erosion properties as well as fatigue strength and fatigue life of final products made employing such clad or unclad alloys.

Figure 12A:
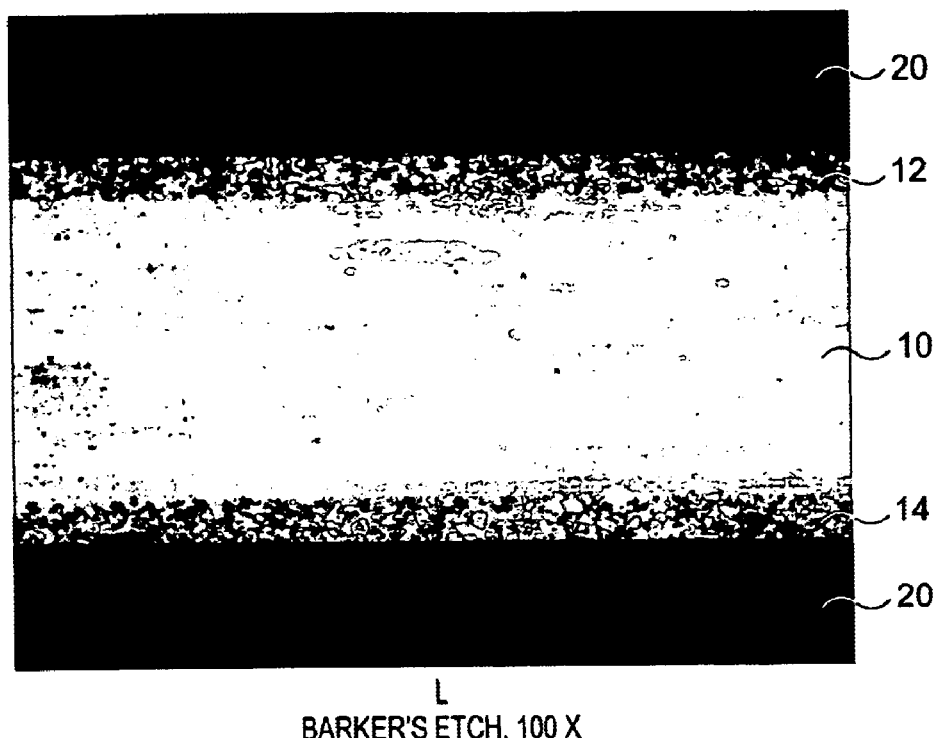
FIGS. 12a and 12b depict micrographs of a brazing alloy according to the present invention.
Figure 12B:
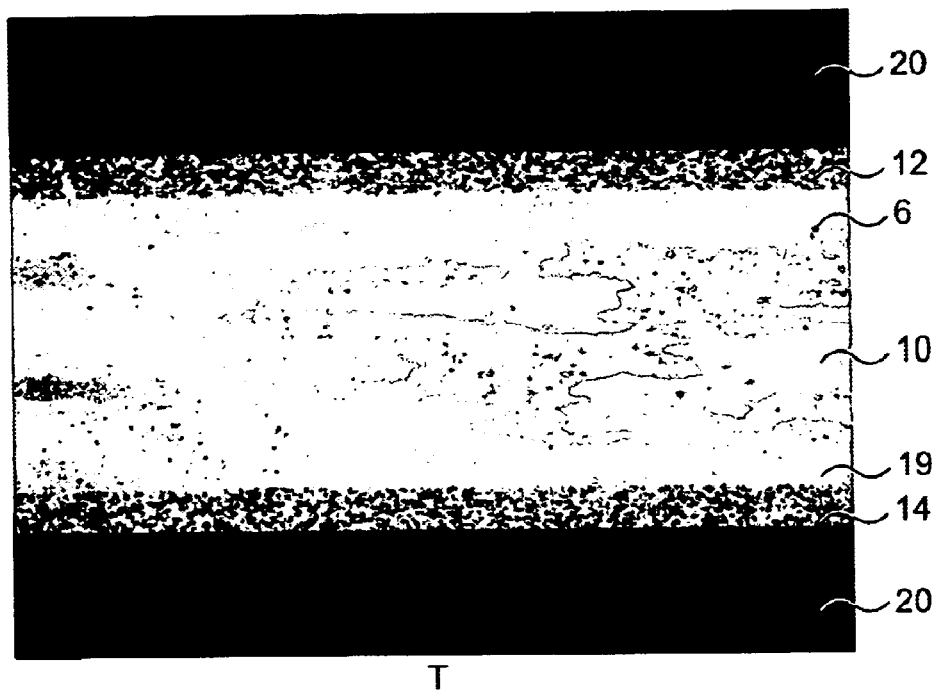
Figure 13:
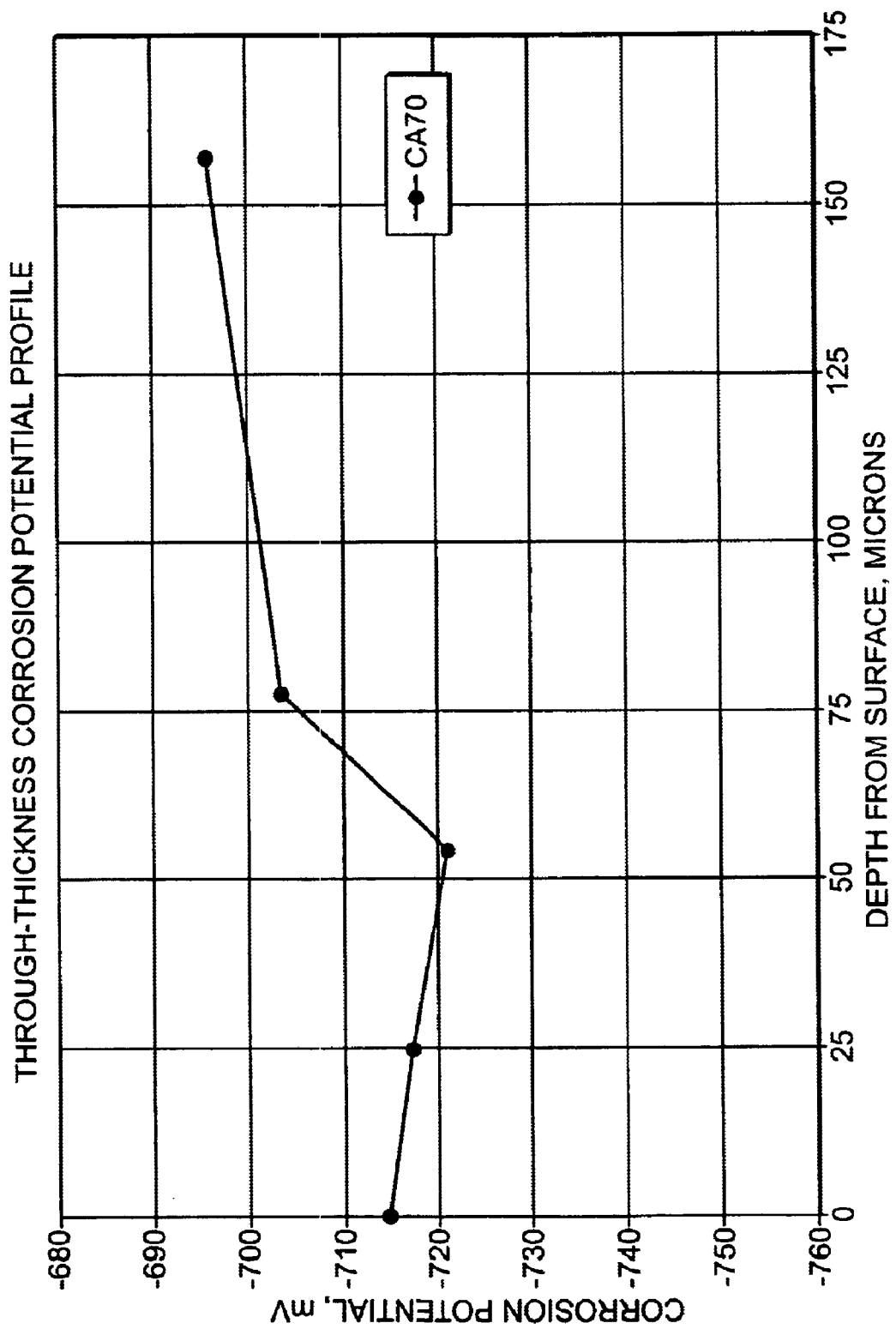
FIG. 13 shows the through-thickness corrosion potential profile of an inventive material of the present invention post-braze.
Figure 17A:
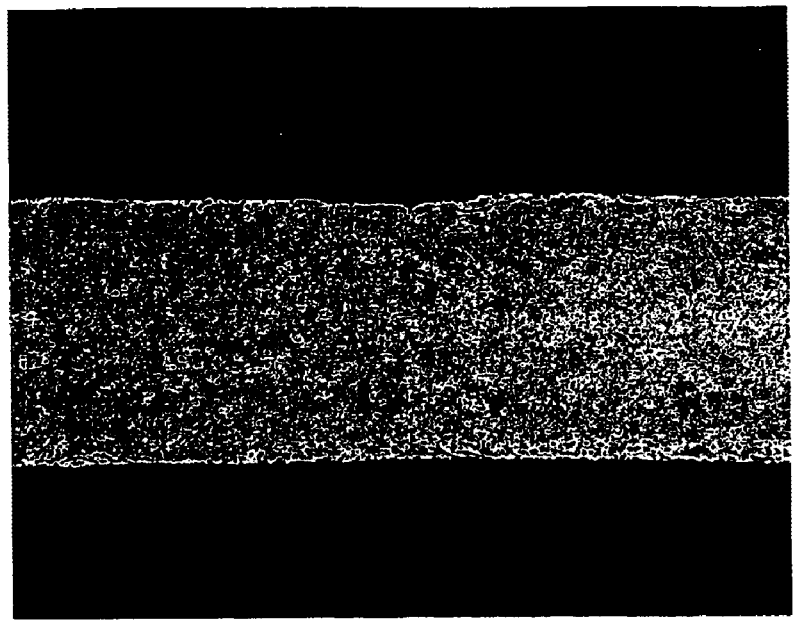
FIGS. 17–19 are micrographs showing results with various % stretch of a material according to the present invention.
Figure 17B:
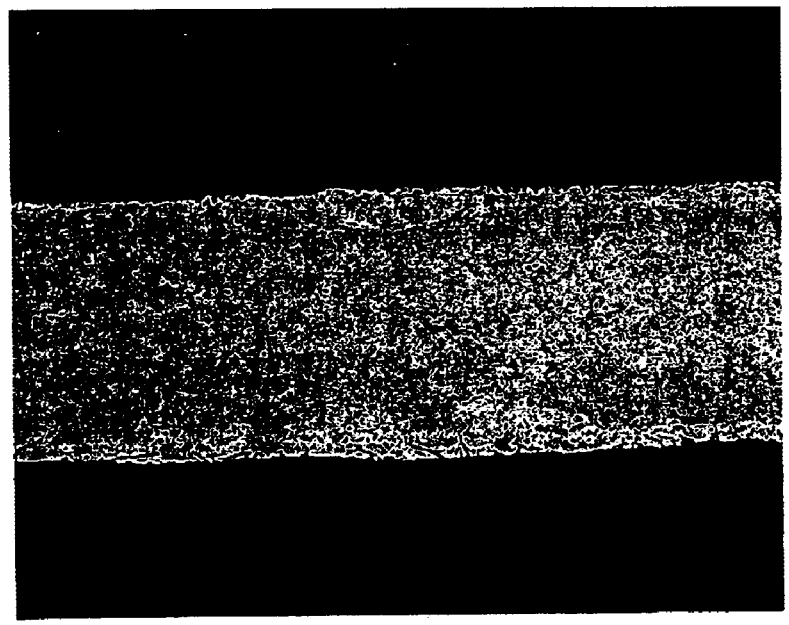
Figure 18A:
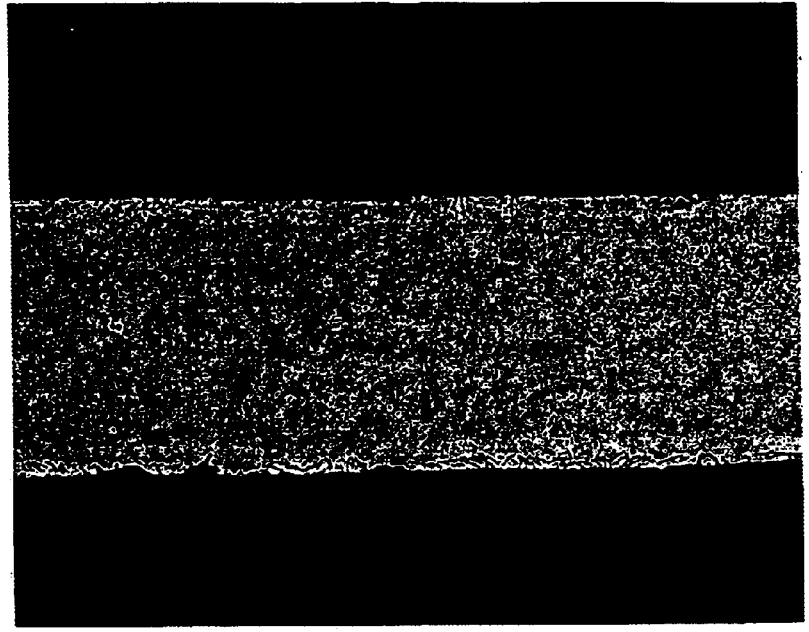
Figure 18B:
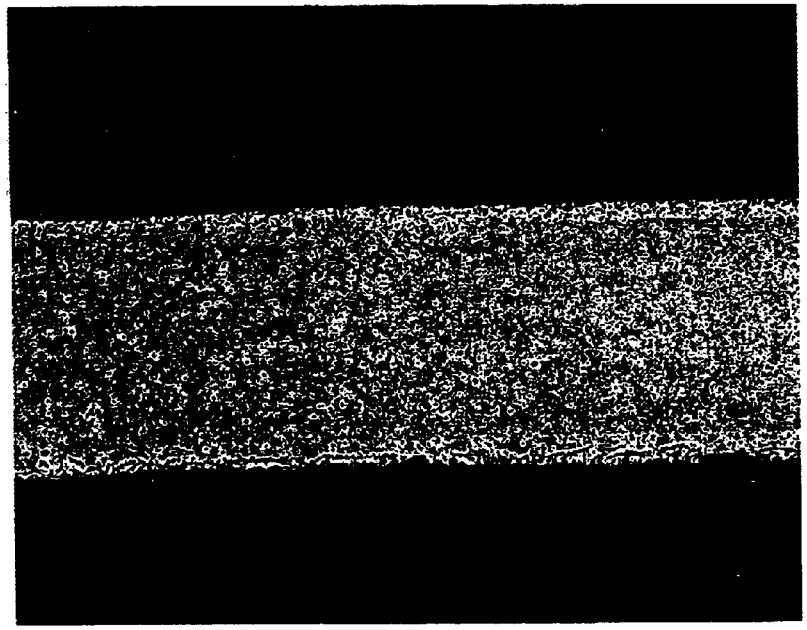
Figure 19:
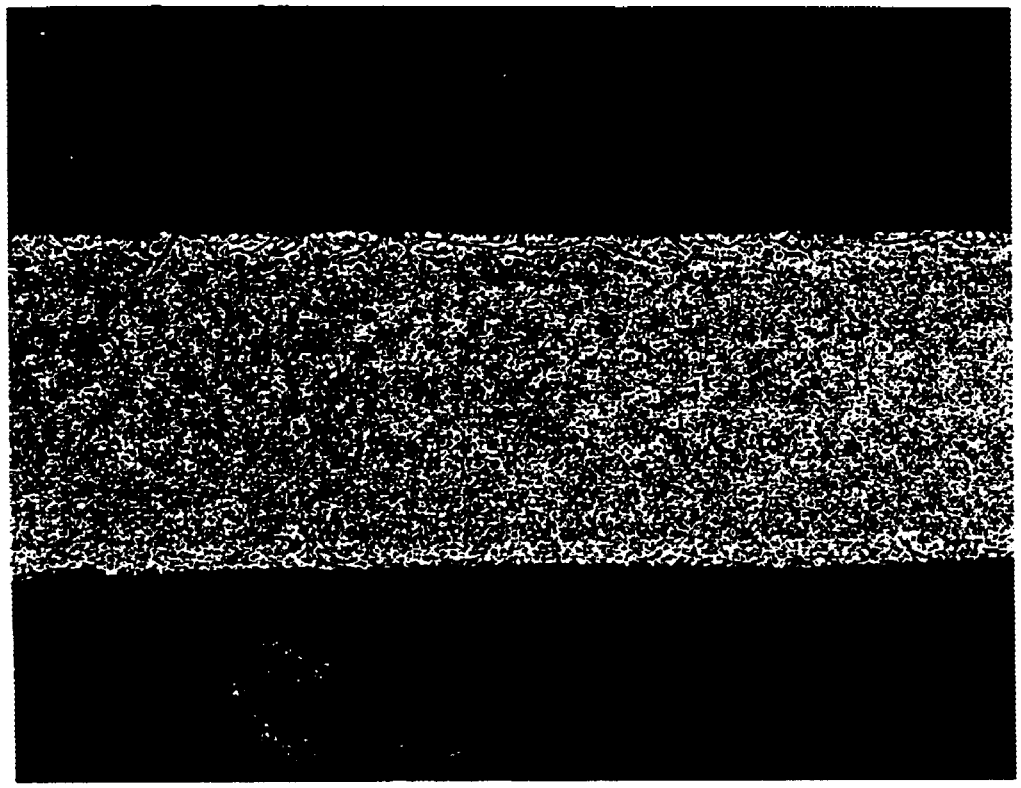
Figure 21A:
FIG. 21 are comparison heavy core dissolution results of a A3003 type brazing sheet.
Figure 21B:
Figure 21C:
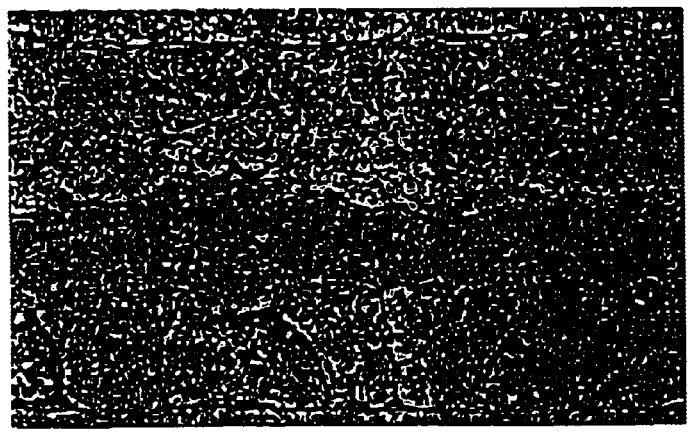
Figure 21D:
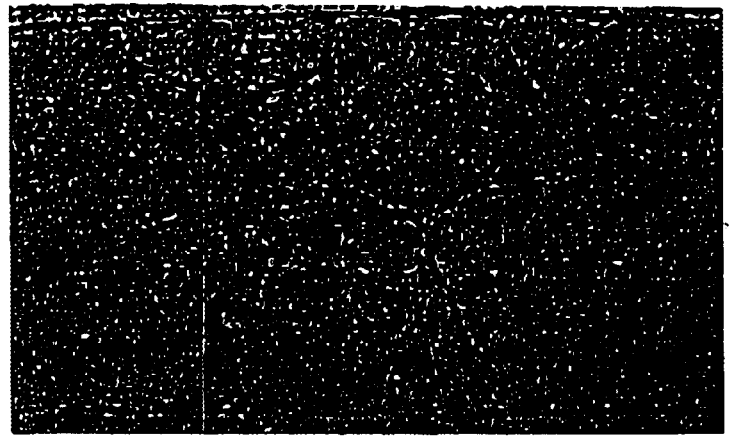
Figure 21E:
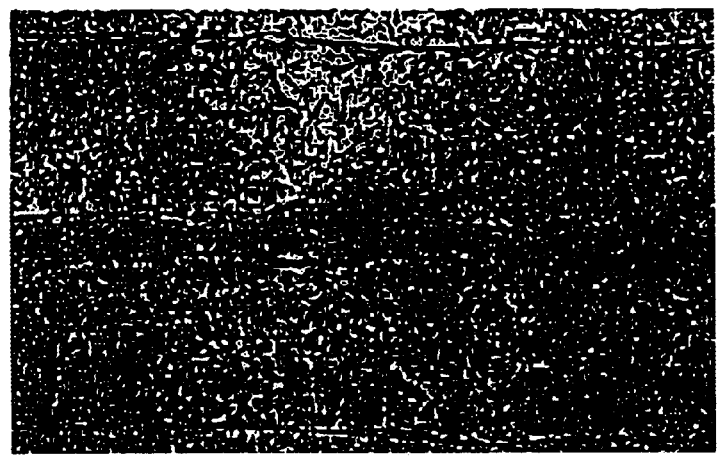
Figure 22:
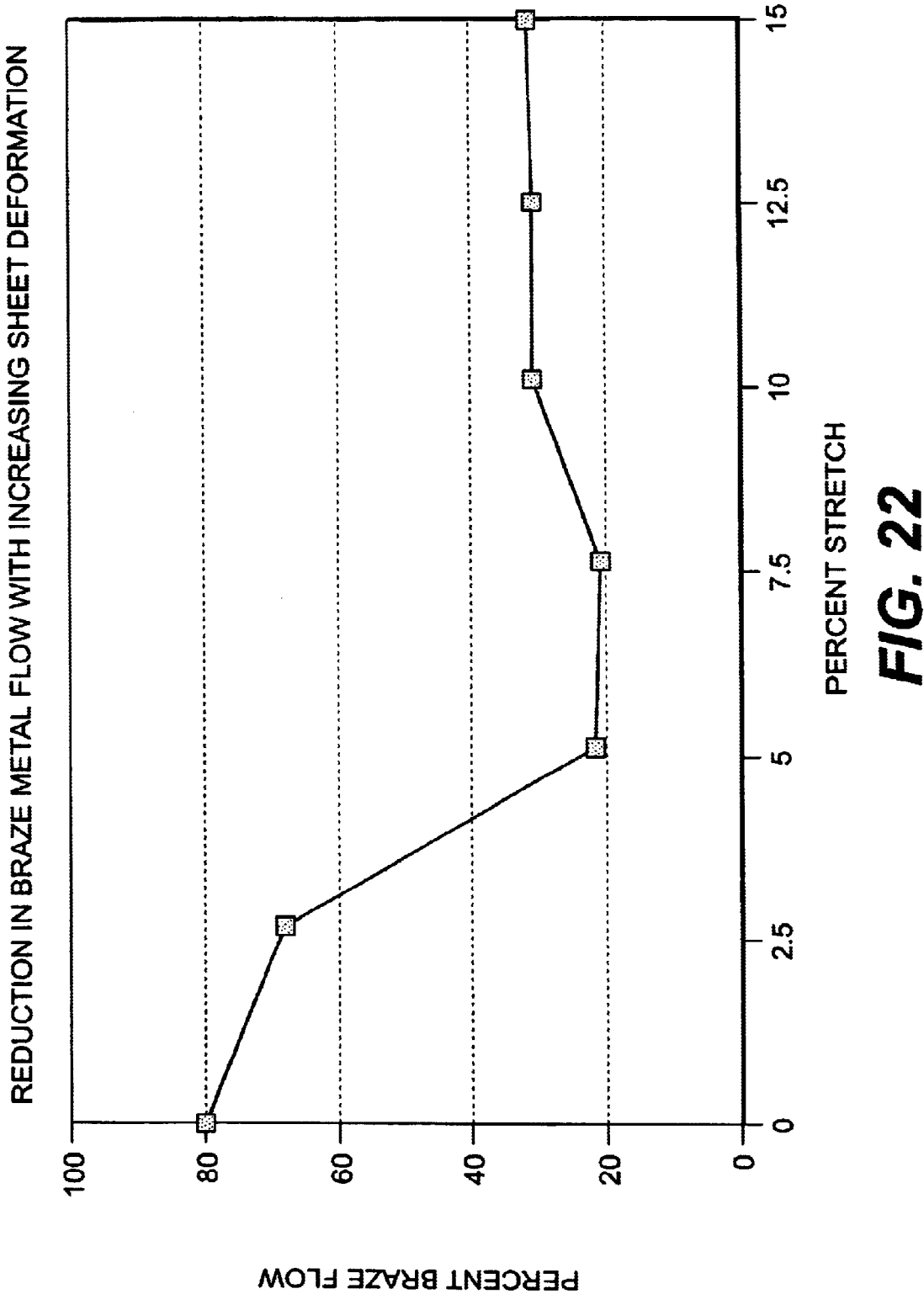
FIG. 22 is a chart showing the reduction in braze metal flow in a prior art material.
Figure 23A:
FIG. 23 show progressive clad melting and initiation of LFM in a prior art material.
Figure 23B:
Figure 23C:
Figure 23D:
Figure 23E:
Figure 24:
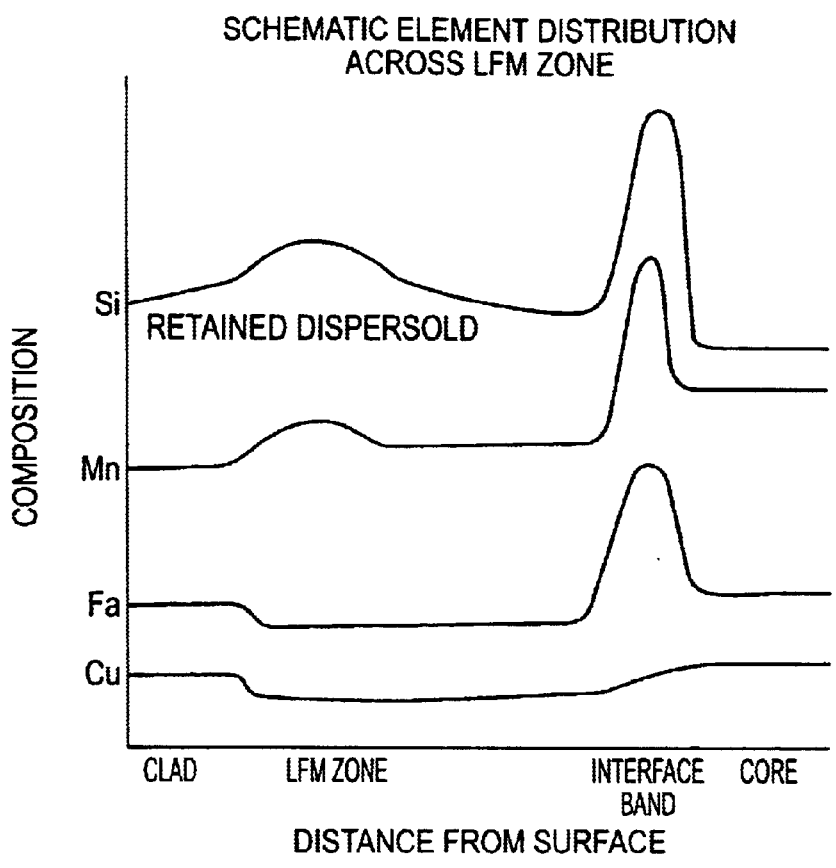
FIG. 24 is a schematic element distribution across the LFM Zone in a prior art material.
Figure 25:
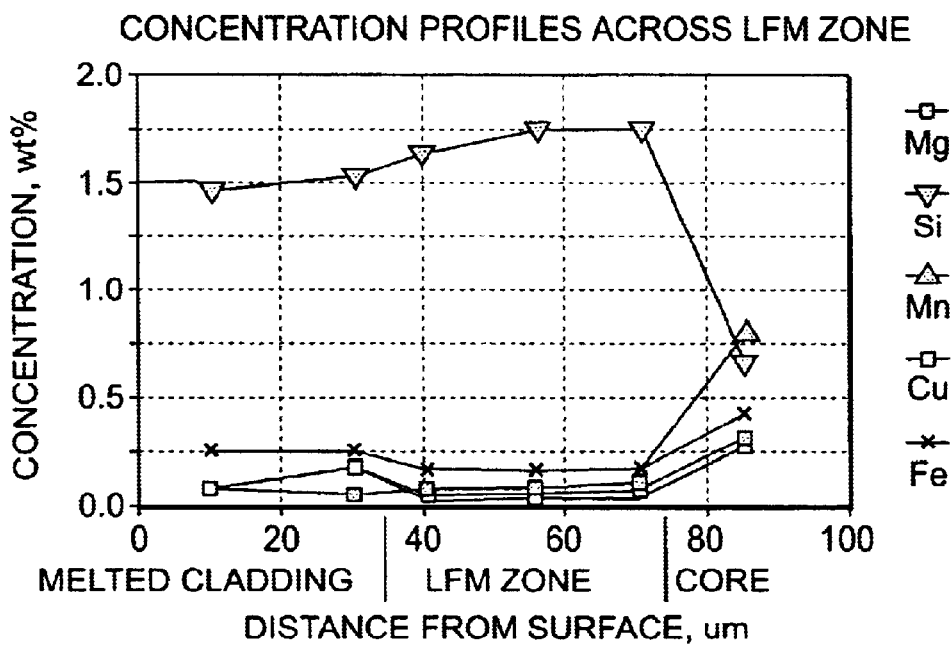
FIG. 25 is a chart giving concentration profiles across the LFM Zone in a prior art material.
Figure 26A:
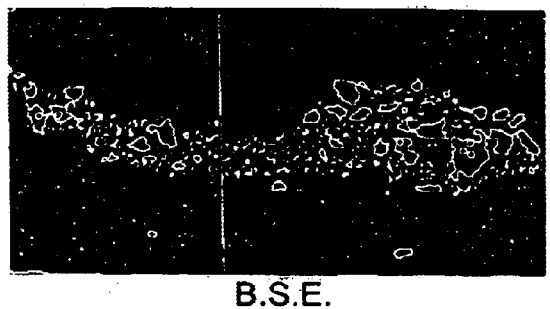
FIGS. 26–27 give LFM data for a prior art material.
Figure 26B:
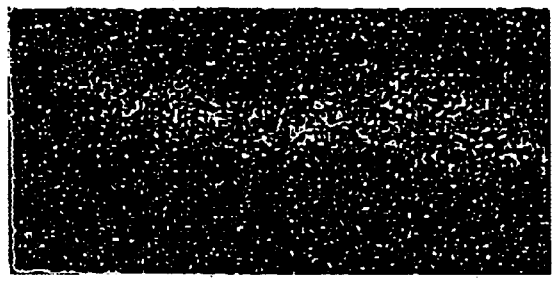
Figure 26C:
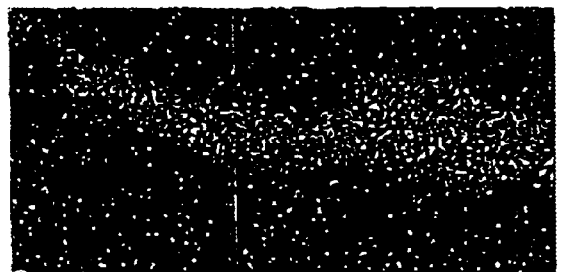
Figure 26D:
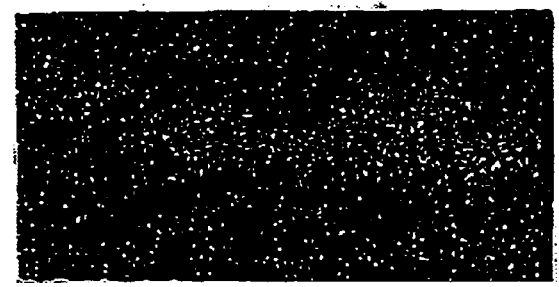
Figure 27A:
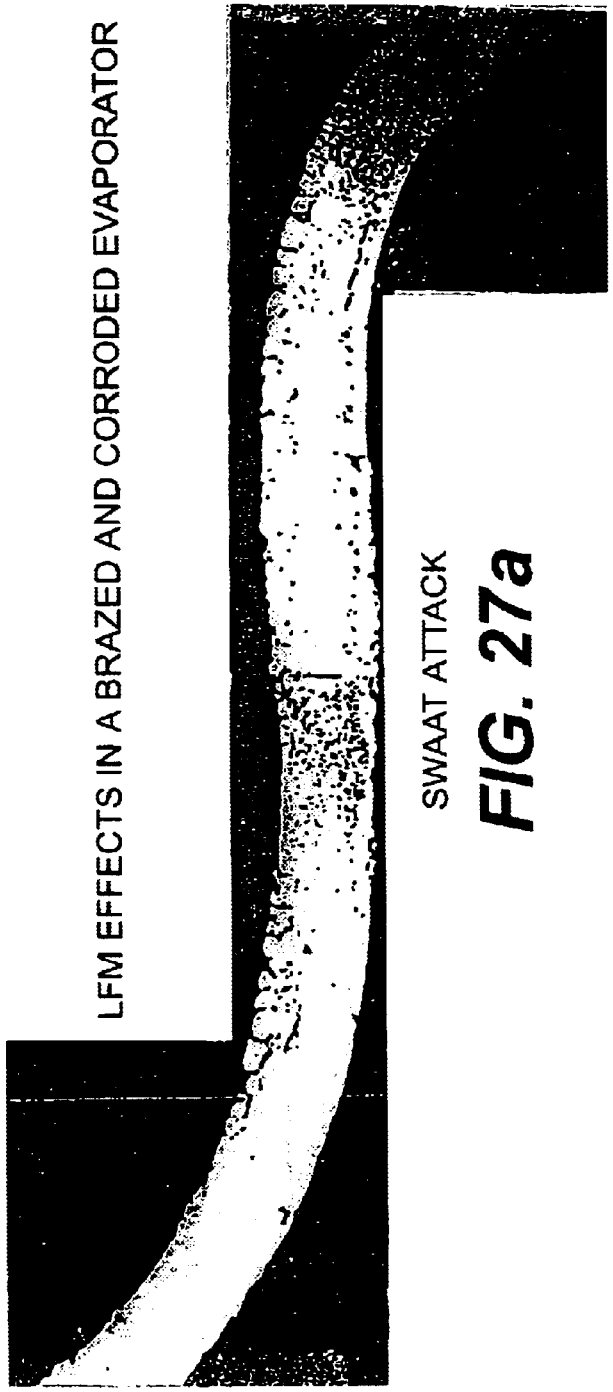
Figure 27B:
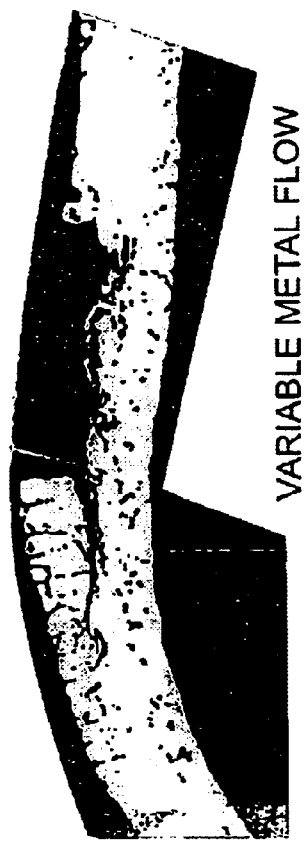

According to an embodiment of the present invention as shown, for example, in FIGS. 12a and 12b, an alloy of the present invention 10 is provided with a clad layer 12, 14 on both sides thereof. At the boundary of the clad 12, 14 and the alloy 10, there is formed an unrecrystallized layer 16, 18 (shown as a thin white section). The section labeled as 20 is the background and not part of the alloy or clad. An unrecrystallized layer of the present invention can be of any desired thickness and in many embodiments is approximately 2 grains in thickness but can be thicker or thinner depending on the desired application. FIG. 12a is a micrograph taken in the longitudinal direction (rolling direction), while FIG. 12b is in the transverse direction of the same material. Note that the material of FIG. 12 could be clad on only one side, in which case either section 12 or 14 is not present. Alternatively, the unrecrystallized layer can be provided on an unclad material in which case both 12 and 14 are not included. The unrecrystallized layer 16 and/or 18 can then be provided on either or both sides of the alloy 10.

All amounts listed herein are weight percent unless stated otherwise. The composition of the alloy 10 can be any desired composition whereby formation of the unrecrystallized layer (URL) is possible. In a preferred embodiment, the alloy and/or the clad includes Cu in an amount from 0.1 to 1.0 or from 0.2 to 1.0 or greater. In some embodiments, the alloy and/or clad is a material that includes manganese in an amount greater than 0.2, preferably 1.0–1.5. In some embodiments, the inventive alloy comprises a material having Si in amounts up to 1.0 or greater, preferably 0.1–1.0, Fe in an amount from trace amounts up to 0.7, preferably up to 0.5, Cu in an amount from 0.1–0.6 or greater, preferably from 0.2–0.5, Mn in an amount of at least 0.5, advantageously from 0.5 to 2.0%, or even from 0.8 to 1.5%, preferably 0.5–1.5 or greater, advantageously from 1.0–1.5, Mg in an amount up to 1.0, preferably <0.9, more preferably <0.7, advantageously from 0.4–0.7, and Zn and Ti in trace amounts up to 0.10, preferably 0.08–0.13.

If the alloy 10 is clad, the clad is provided on one or both sides and comprises a material having Si in an amount of 1.0–13%, preferably from 6.0–12.0, most preferably 7.0–11.5. If there is a clad on both sides of the alloy, the clad layers may be the same or different. In some embodiments, one or both of the clad layers comprises A4045.

In some embodiments, the presence of manganese precipitating in fine particles whereby the manganese is in solution during the formation of the material accounts for the presence of the unrecrystallized layer in the alloy. As such, there must be at least 0.2% manganese in the alloy 10 for the manganese to contribute to any substantial degree to formation of the unrecrystallized layer. In addition, in such situations, there is preferably at least 0.2% Cu, more preferably from 0.2–1.0% Cu in the alloy 10. If the alloy 10 is clad, the silicon from the clad will assist in the formation of the unrecrystallized layer during processing. As such, there should preferably be some amount of silicon in the clad, most preferably an amount of at least 5%. According to an embodiment of the invention, the fact that the alloy 10 is formed by a direct chill process in the formation of the initial ingot may contribute in a favorable way to the formation of an unrecrystallized layer during processing. This may possibly be attributed to the fact that the direct chill formation of the ingot results in material that has a finer microstructure at the surface areas than in the central portions thereof, thereby facilitating that a certain layer of material remain unrecrystallized during annealing or heat treatment.

According to an embodiment of the invention, the core material is subjected to an optional homogenization treatment just after casting. In the homogenization treatment, the alloy 10 is not fully homogenized, but rather, homogenized at a low temperature according to what is known as a partial homogenization, i.e., from 850–1075 degrees F. (454 C to 579 C) for 2–16 hours instead of the traditional 1100–1160 degrees F. (593 C-627 C) for 2–16 (or even >16) hours. The formation of the unrecrystallized layer, in such embodiments can be provided with no homogenization at all or a partial homogenization.

As seen in the previous paragraphs, it is believed that the formation, after final annealing, of an unrecrystallized layer at the interface between core and clad materials or directly at the surface of unclad products is due to a locally enhanced precipitation of very fine particles that have the ability to block or delay dislocation movement, thereby impeding the formation of a polygonized subgrain structure during recovery. These particles are generally Mn-containing in 3xxx alloys usually used for heat exchanger sheets, but could also be produced by incorporating other dispersoid forming elements in the alloys in presence, such as: Zr, Cr, Hf, Sc, V and the like.

In order to promote fine precipitation in the core alloy, special pre-heating treatments can optionally be applied either to the core ingot only (i.e. prior to its assembly with the clad(s)), or to the entire composite. In one preferred embodiment, the core ingot is subjected to a thermal treatment that includes maintaining a temperature between 850 and 1075 degrees F. for 2 to 16+ hours. Temperatures that are too low might lead to very slow diffusion phenomena and, as a consequence, insufficient precipitation. On the other hand, temperatures that are too high could lead to higher solubility of solute atoms in aluminum and furthermore to precipitate coarsening. These two effects may reduce the number of small precipitates available to hinder recrystallization in the later stages of the transformation path. Thermal conditions applied to the coil during final annealing may also play a role in controlling precipitation. They may also be involved in obtaining a partially recrystallized state of the material.

It should be noted that the precise conditions that are beneficial to practice in order to maximize the formation of an advantageous unrecrystallized layer of the present invention can include numerous factors such as the chemistry of the core as well as the composite gauge. For example lower Mn concentrations, i.e. less than about 1.2% or even 1%, with concomitant lower dispersoid densities for a given preheat cycle, may require tighter controls of the pre-heat conditions and potentially a shorter or lower temperature pre-heat cycle (for example a pre-heat cycle that includes holding times between 850 and 1075° F. that are 50% or more shorter). Similarly, higher Mg concentrations, i.e. greater than about 0.5 or 0.1%, may also affect the optimium pre-heat cycle window.

Furthermore, the difference in precipitation density that is observed between a central part of the core alloy and an outer part thereof (whether it is clad or not), and which explains why recrystallization is slower in the latter region compared to the former, can be promoted by different operations.

A first possibility is to precisely control the differences in cooling rates between the surface of the core ingot and its central part that occur during casting. In addition, such control of cooling of the cooling rate throughout the ingot would also control segregation phenomena that occur during solidification, at least to some extent. By doing this, the initial situation of the ingot (in terms of the size and density of precipitates and/or solid solution supersaturation and/or dendrite arm spacing) can be favorable to uneven recrystallization during the final anneal.

Another option is to have the thermal conditions vary in the thickness of the ingot during the pre-heating treatment by acting on heating rates or cooling rates in such a way that the surface temperature evolution would differ compared to the center temperature variation.

A third way is to manage hot-rolling in such a way that, due to inhomogeneous temperature and/or deformation distribution through the thickness of the plate, differences in precipitation intensity and/or in recrystallization are observed.

Other ways to control recrystallization include, in the case of clad products, controlling diffusion of a particular element or elements from the clad to the core. Such diffusion control would reduce the solubility of a dispersoid forming element present in the core ingot and in turn, lead to fine precipitation at the core/clad interface. As an example, Si can play this role towards Mn precipitation. Any method that permits formation of a discrete layer of unrecrystallized material at the surface (or between a core and clad) would be useful in the present invention.

In preferred embodiments of the present invention, the alloy is formed by the following process:
 1) Casting by direct chill method
 2) Optional partial homogenization
 3) Cooling according to known techniques
 4) Machine and scalping treatment according to known techniques
 5) Apply clad, if desired on one or both sides according to known techniques
 6) Preheat to a temperature, preferably from 800–1050 degrees F. (427 C to 566 C)
 7) Hot roll into a coil of preferably 0.070–0.350 inches
 8) Cold roll through a mill, at or near room temperature to reduce the thickness to 0.0025 inches-0.150 inches (0.0625–3.75 mm)

9) Subject to an anneal sufficient to recrystallize most of the grains and render the alloy soft enough to form the desired part, the anneal preferably involves putting the coil in an inert atmosphere furnace at a temperature from 600–750 degrees F. (315.5–398.9° C.) for 2–16+ hours so the aluminum does not oxidize but the recrystallization occurs.

In preferred embodiments, the unrecrystallized portion of the alloy after annealing from 2–50 microns, preferably from 5–20 microns, and is preferably at least 5 microns in thickness. The unrecrystallized layer can represent approximately up to 20% by volume of the alloy. The thickness of the URL may be constant or may vary along the length of the alloy.

The provision of an unrecrystallized layer on the surface of an unclad material or between the clad and core in a layered material has many advantages over known materials. Unclad materials may have uses in the aerospace industry, in consumer products, highway products, vehicle panels, marine applications. The clad material wherein the unrecrystallized layer is formed between the clad and core has usefulness in brazing applications and automotive uses such as evaporator plate since the corrosion/erosion properties of such a material are superior to those of materials that do not possess such unrecrystallized layers. That is, migration around the pancake-shaped grains of the unrecrystallized layer (URL) is a more tortuous path for corrosion/erosion to take, thereby increasing the energy required for the corrosion to invade the core. As such, the URL itself arrests corrosion/erosion into the core, drastically increasing service life of a heat exchanger or other product made therewith.

The inventive product, including that of Examples 1 and 2, shows an improvement in core erosion over conventional products up to about 90%. See, for example, Example 3 for purposes of comparison.

Products of the present invention show little or no degradation in core erosion performance when formed up to 10%.

Products of the present invention can exhibit a 10% or greater increase in SWAAT life (salt water acetic acid test according to ASTM G85), often greater than 20%, in other cases, greater than 30% or 40%, in some cases up to 50%, 75% or even 100% or greater over the conventional products such as A3003 type brazing sheet and A3005 type brazing sheet. According to some embodiments of the present invention, there is provided a SWAAT life up to 1200 hours.

According to some aspects of the present invention, such products also have superior LFM onset and progression properties as compared with conventional A3003 or A3005 brazing sheet.

The following examples are illustrative only and not intended to limit the invention in any way.

EXAMPLES

Example 1

Mill produced evaporator braze sheet having the below composition, 0.017" gauge with 10% nominal clad on both sides was evaluated.

The investigated characteristics include pre- and post-braze mechanical properties, braze flow and core erosion as a function of stretch, and SWAAT corrosion life. The purpose of stretching the material is to evaluate the effect of forming on the braze flow and core Post-braze yield and ultimate tensile strength of the sheet are 6.74 ksi and 21.46 ksi (46.47 MPa–148.0 MPa), respectively. Core erosion is absent at all levels of stretch prior to brazing. SWAAT corrosion life of coupons without any stretch is 332 hours. The stretched coupons exhibit similar or better SWAAT corrosion resistance.

The following characteristics were evaluated:
(i) Pre-braze (O-temper) and post-braze microstructures,
(ii) Pre- and post-braze tensile properties,
(iii) Pre-braze formability (Olsen cup test),
(iv) Braze flow and core erosion at different levels of stretch up to 10%,
(v) Through-thickness corrosion potential profile, and
(VI) SWAAT life and corrosion damage (as a function of pre-stretch from 0–10%).

Experimental
Vacuum Brazing
Drip strips of 2³⁄₁₆" width and 4⅞" length were vacuum brazed using the following braze cycle:
Preheat to 450 degrees F. (232 C)
Ramp to 800 degrees F. (427 C)-9 minutes
Ramp 800 to 1070 degrees F. 427–577 C-5 minutes
Hold 1070 degrees F577 C-5 minutes
Ramp 1070 to 1100 degrees F. 577–593 C-2 minutes
Hold 1100 degrees F.-593 C 3 minutes
Pull and air cool.
Coupons of 2" width and 8" length were also vacuum brazed in order to prepare specimens for post-braze tensile tests.

Olsen Cup Test
The formability of the pre-braze sheet was assessed making use of the cup test according to the test procedure of ASTM Designation: E643-84-Reapproved 1990.

Tensile Test
Tensile tests were performed on pre- and post-braze sheet specimens according to the test procedures of ASTM Designation: B557-94. The yield strength was calculated by the 0.2% offset method using an extensometer mounted over a 2" gauge length of the test specimen.

Effect of prior cold work on braze flow and core erosion
Strips of the brazing sheet were stretched in tension to varying tensile strain up to 10% in order to simulate the forming operation prior to brazing. Standard drip strips prepared from the stretched sheets were vacuum brazed and the braze flow evaluated from the weight of the drip in each case. It is expressed as percent of the total amount of clad available for melting and flow. Making use of metallographic observations of various post-braze drip strips, the core erosion is calculated from:

$$\text{Core erosion \%} = [1 - (T_c/T_{co})] * 100$$

where T c is the core thickness in the post-braze sheet and T co is the original core thickness in the pre-braze sheet.

| Core alloy | Si | Fe | Cu | Mn | Mg | Zn | Ti |
|---|---|---|---|---|---|---|---|
| | 0.25 max. | 0.20 max. | 0.45–0.75 | 1.3–1.7 | 0.05 max. | 0.10 max. | <0.10 |

Metallography

Metallographic examination was carried out making use of standard methods of specimen preparation. Etching with ½% HP solution was employed for O-temper and post-braze microstructural observations and corrosion damage. Specimens were anodized using Barker's reagent and observed with polarized light to reveal grain structure in pre- and post-braze states. See FIGS. 1–4.

Corrosion Potential

Post-braze corrosion potential measurements were carried out at different depths from surface to the center of the sheet according to the procedure of ASTM-069.

SW AA T Corrosion Test

SW AAT corrosion tests were performed on brazed coupons according to the ASTM 085-A3 test procedure.

Results

TABLE 1

Mechanical Properties

| Specimen # | Pre-braze YS, ksi (Mpa) | Pre-braze UTS, ksi (Mpa) | % Elong. | Post-brze YS, ksi (Mpa) | Post-brze UTS, ksi (Mpa) | % Elong. |
|---|---|---|---|---|---|---|
| 1 | 8.99 (62.0) | 20.88 (144.0) | 29.3 | 6.59 (45.4) | 21.31 (146.9) | 23.2 |
| 2 | 9.50 (65.5) | 21.42 (147.7) | 25.0 | 6.95 (47.9) | 21.75 (150.0) | 24.7 |
| 3 | 9.26 (63.9) | 21.69 (149.6) | 25.0 | 6.69 (46.2) | 21.39 (147.5) | 23.2 |
| 4 | — | — | — | 6.71 (46.3) | 21.37 (147.4) | 24.3 |
| Mean | 9.25 (63.8) | 21.33 (147.1) | 26.4 | 6.74 (46.5) | 21.46 (148.0) | 23.9 |
| Means of 4 samples | Olsen cup depth 0.326" (8.29 mm) | | | | | |

TABLE 2

Effect of prior cold work on braze flow and core erosion

| % Stretch | % Braze flow | % Core erosion |
|---|---|---|
| 0 | 22 | 0 |
| 2.5 | 21 | 7 |
| 5 | 32 | 4 |
| 7.5 | 35 | 5 |
| 10 | 41 | 4 |

Pre- and post-braze tensile properties of the sheet and the formability test data are listed in Table 1. The mean values of post-braze yield and ultimate tensile strength are 6.74 ksi and 21.46 ksi, respectively.

Figure 1A:
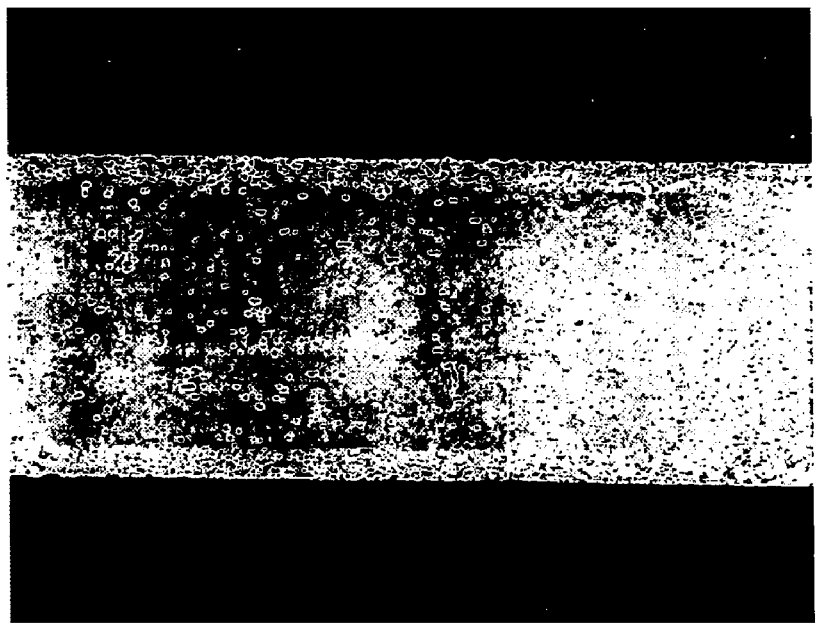
FIG. 1a and 1b depict micrographs of a brazing alloy of the present invention.
Figure 1B:
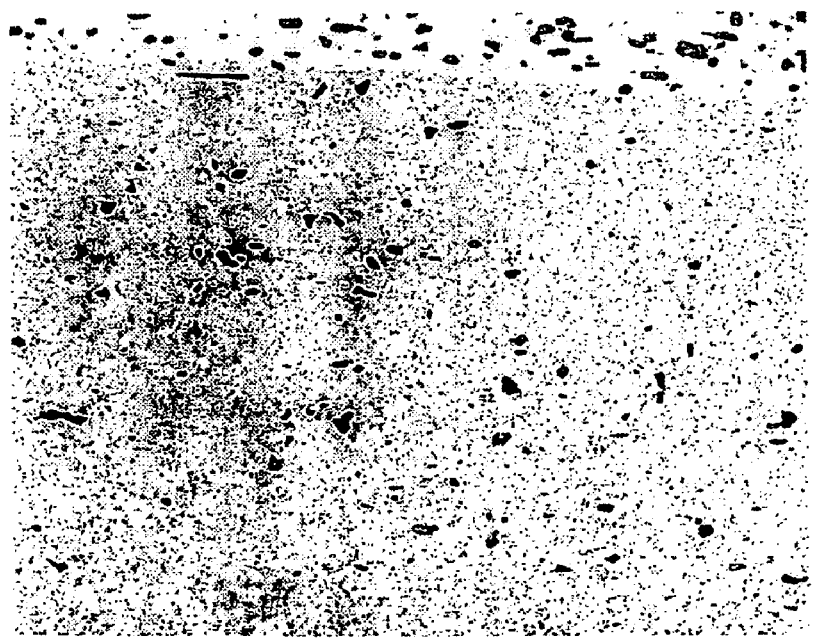
Figure 2A:
FIGS. 2a and 2b depict micrographs of a brazing alloy of the present invention before brazing.
Figure 2B:
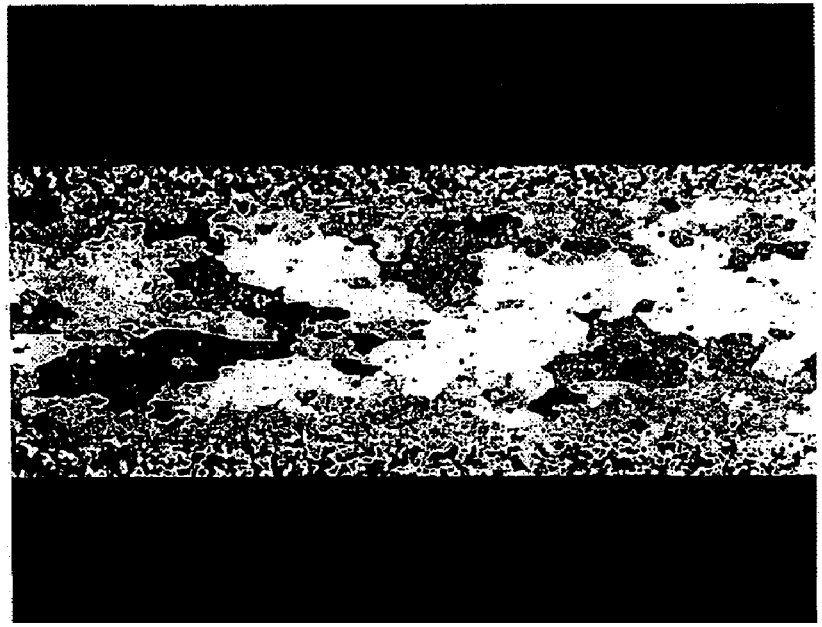
Figure 3A:
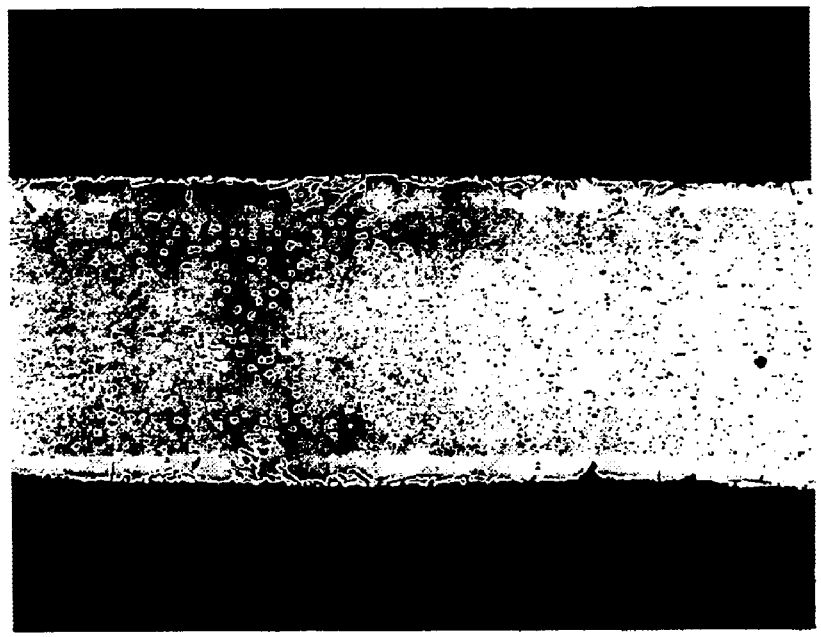
FIGS. 3a, 3b, 3c, 3d, 3e, and 4a, 4b, 4c, 4d and 4e show post-braze metallographic observations indicating the extent of core erosion in various samples.
Figure 3B:
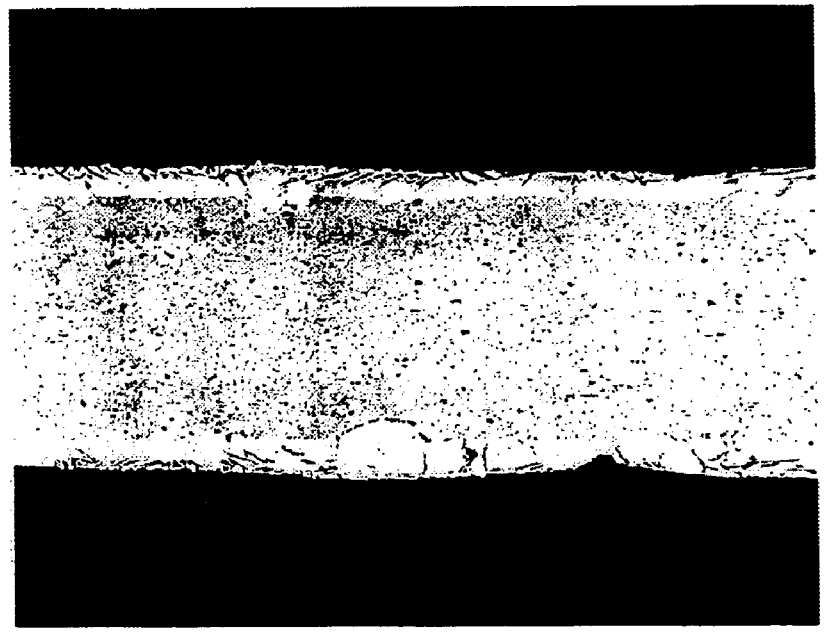
Figure 3C:
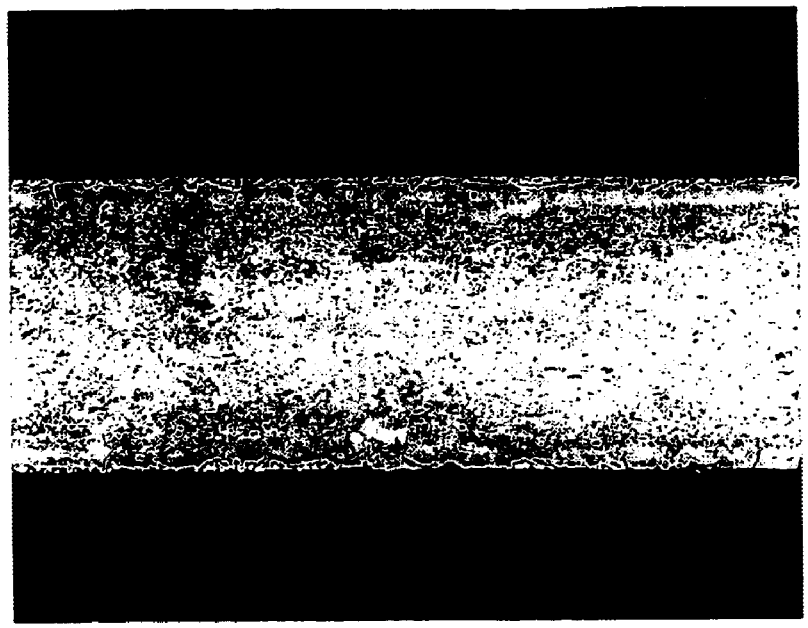
Figure 3D:
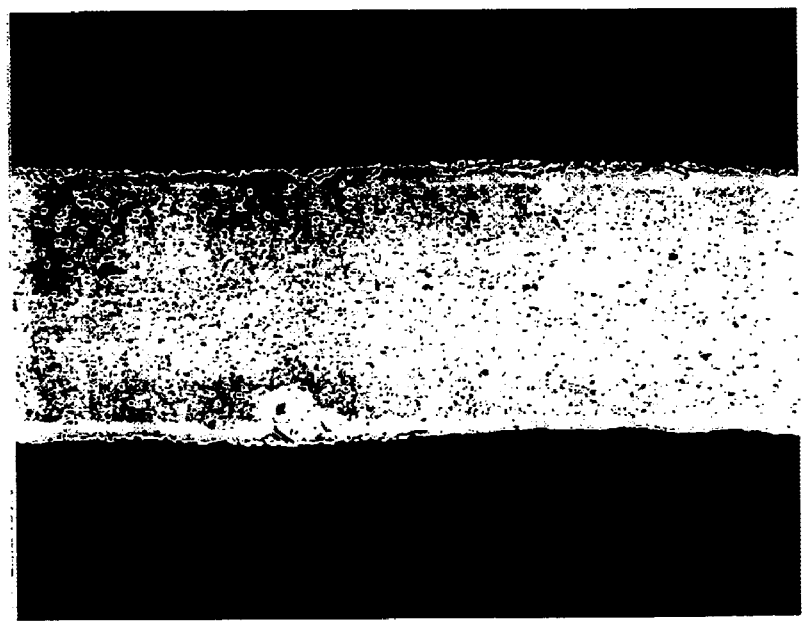
Figure 3E:
Figure 4A:
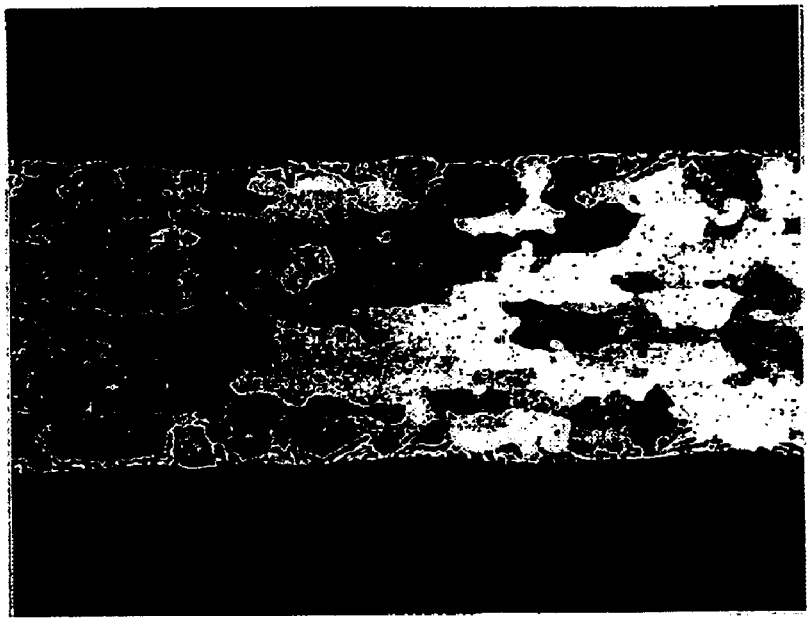
Figure 4B:
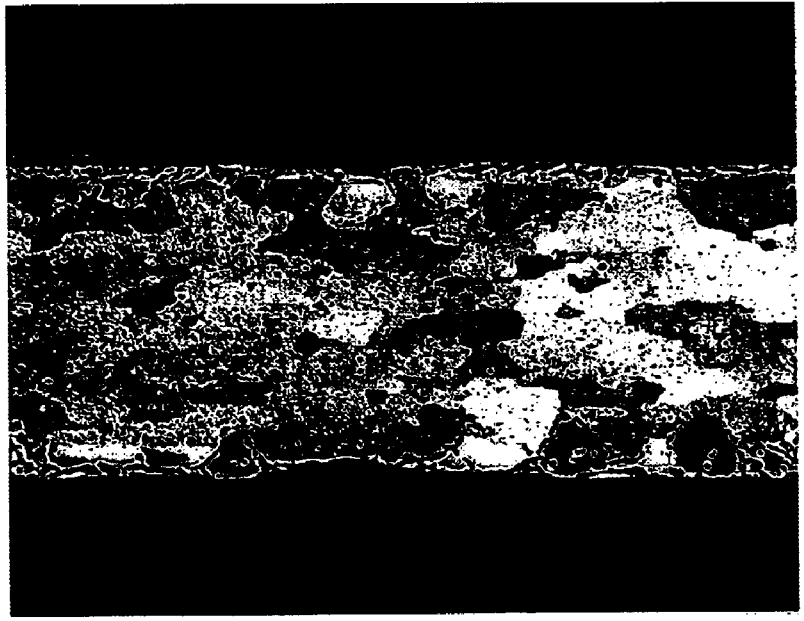
Figure 4C:
Figure 4D:
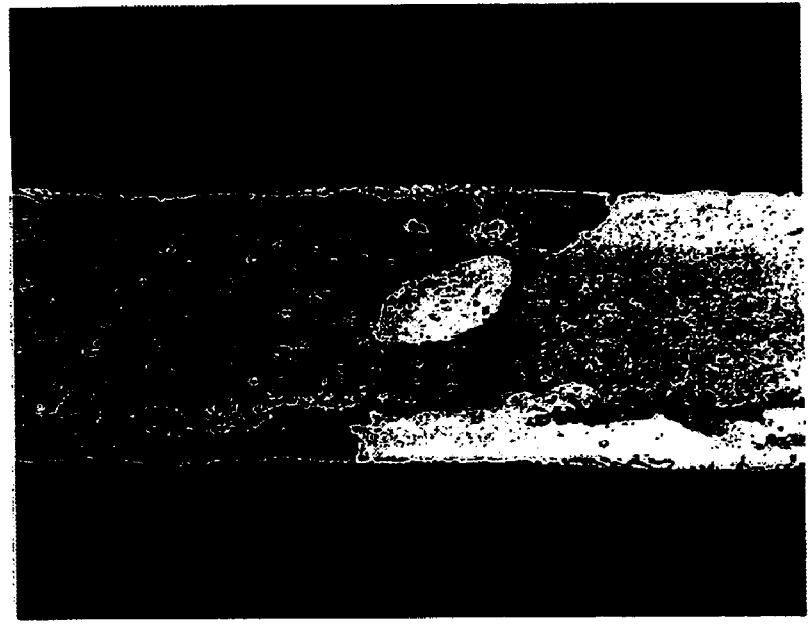
Figure 4E:
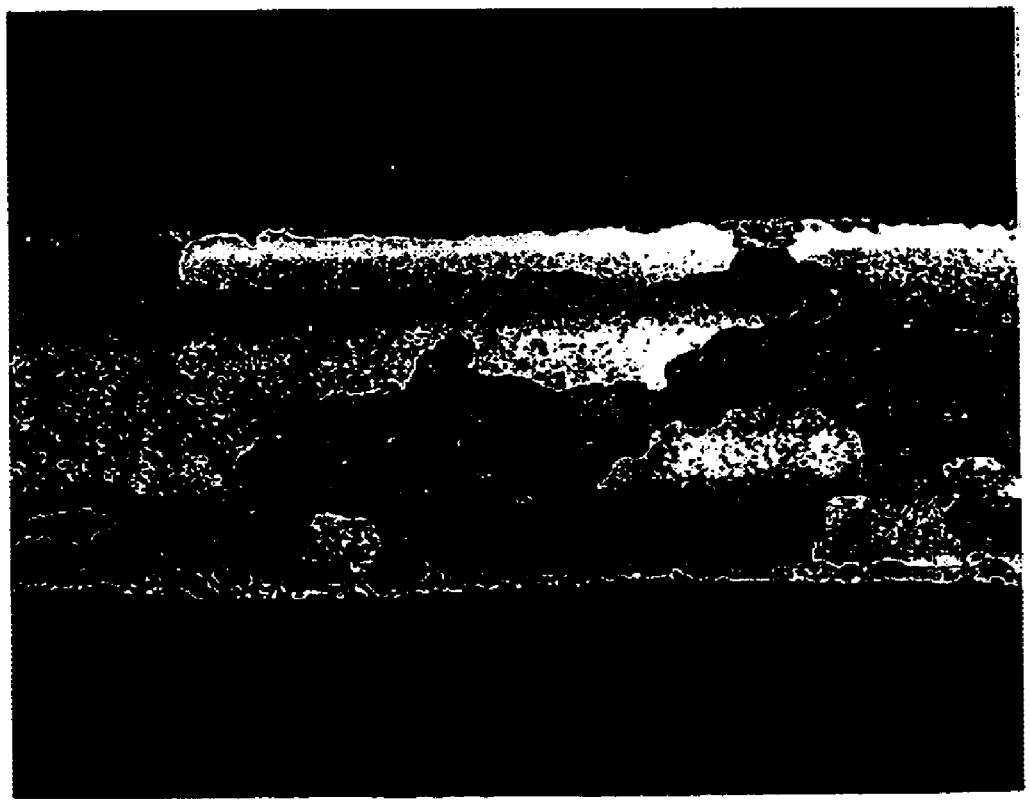
Figure 5:
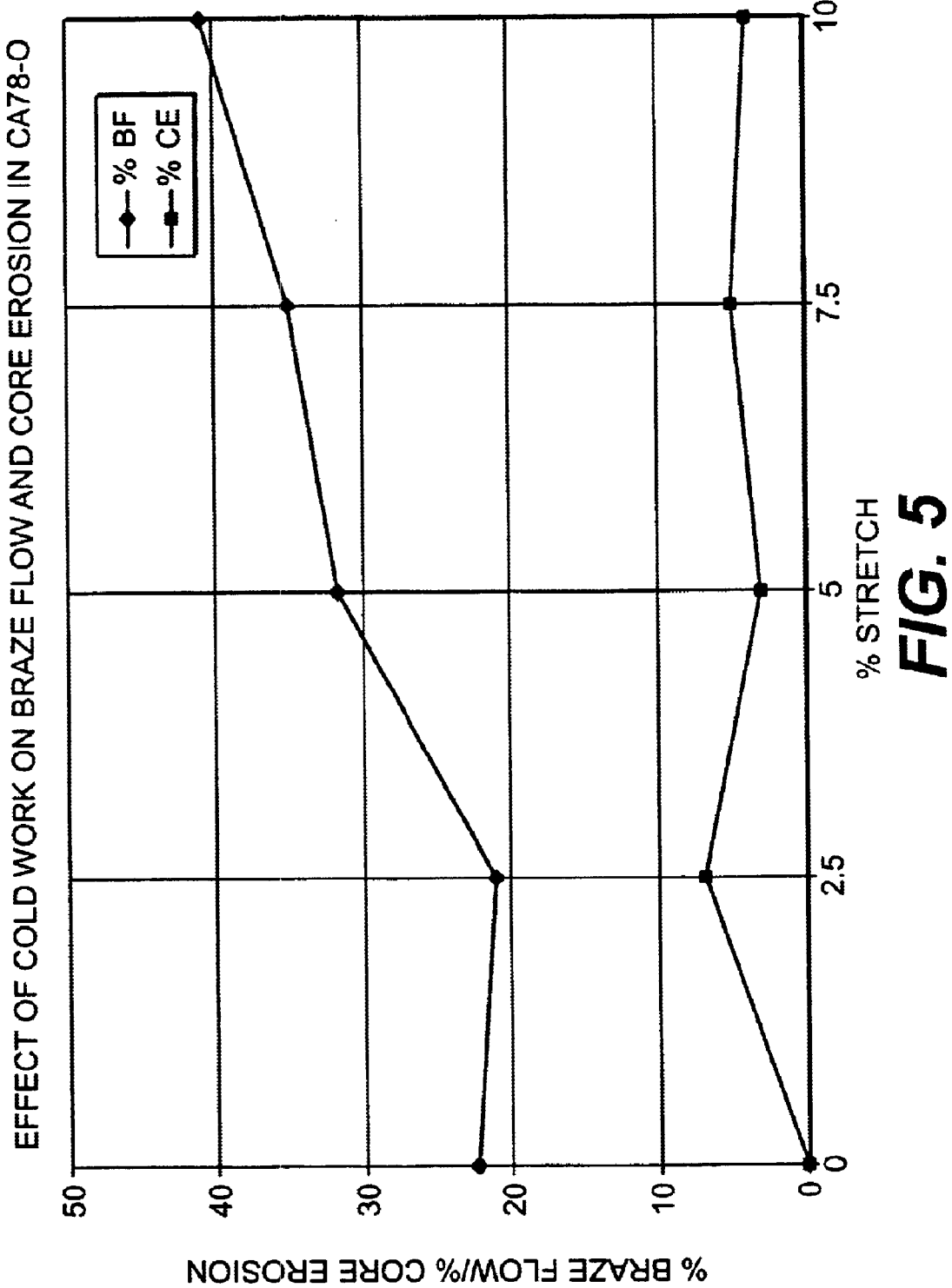
FIG. 5 is a plot of core erosion results in accordance with an alloy of the present invention.
Figure 6:
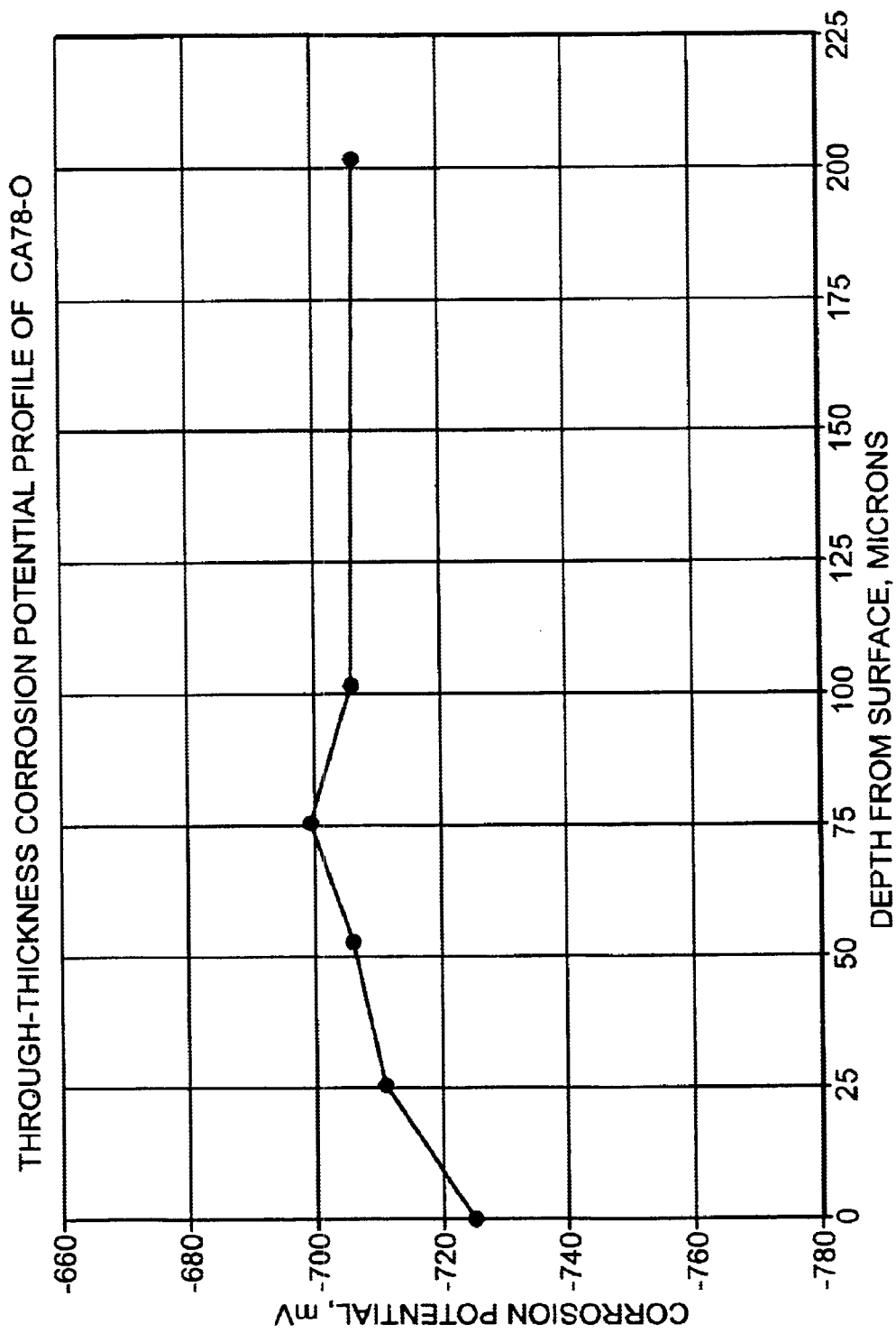
FIG. 6 shows the through-thickness corrosion potential profile of a post-braze brazing alloy of the present invention.
Figure 7A:
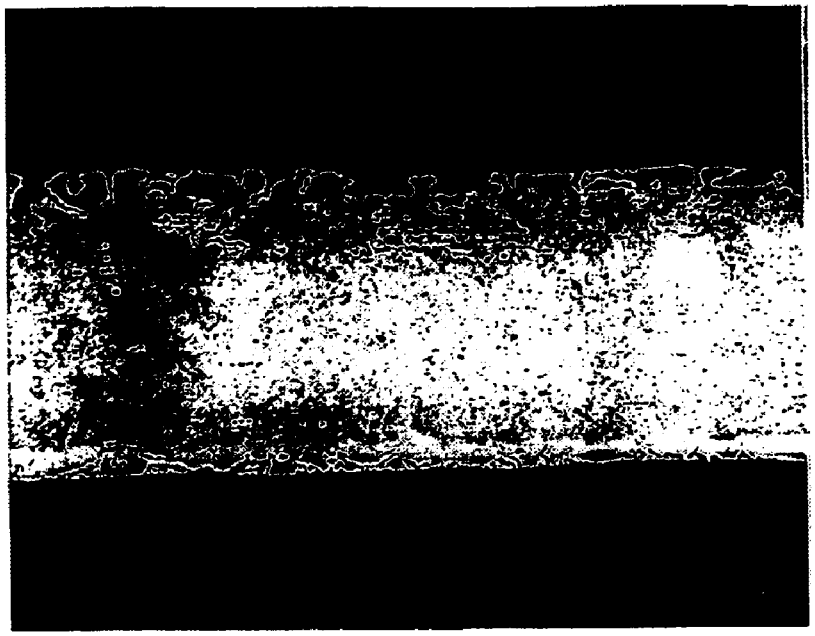
FIGS. 7–11 show SWAAT corrosion damage of brazed alloys according to ASTM G-85-A3 test procedure.
Figure 7B:
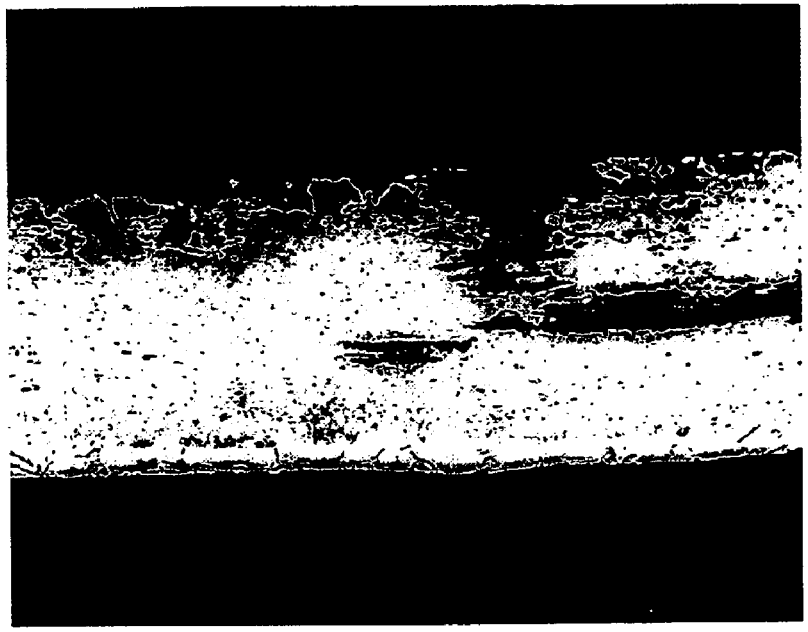
Figure 7C:
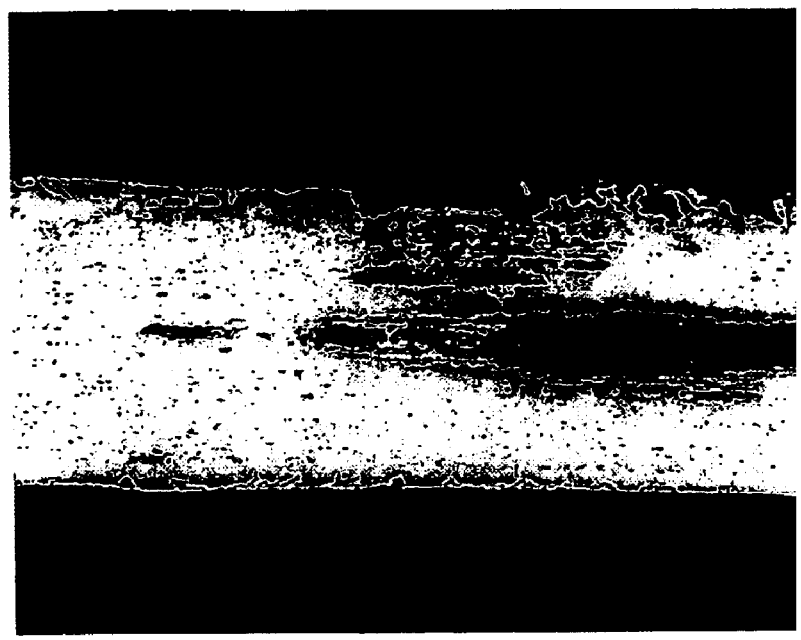
Figure 7D:
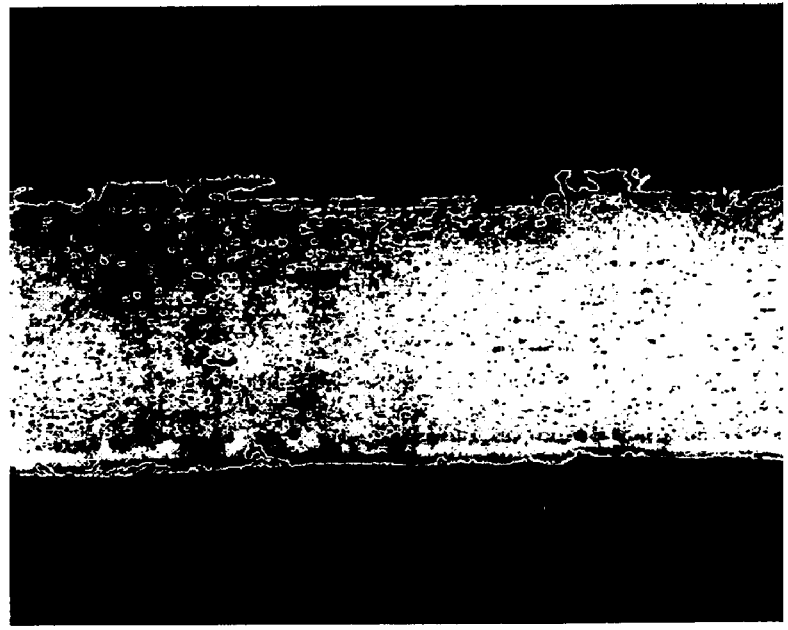
Figure 8A:
Figure 8B:
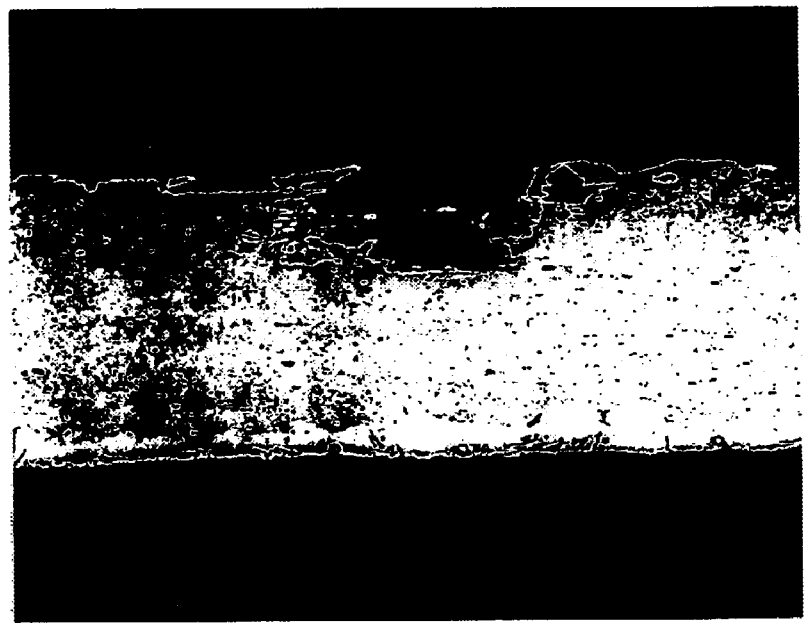
Figure 9A:
Figure 9B:
Figure 10A:
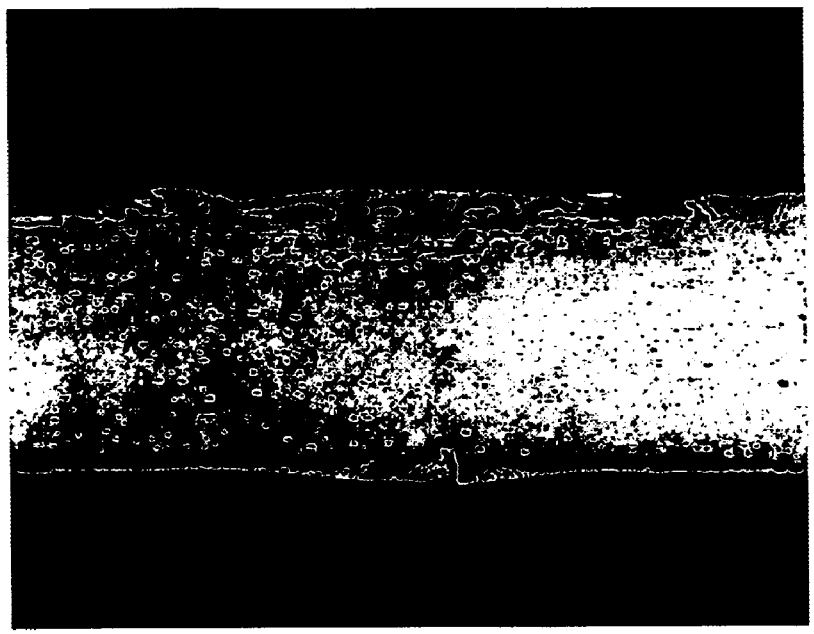
Figure 10B:
Figure 11A:
Figure 11B:
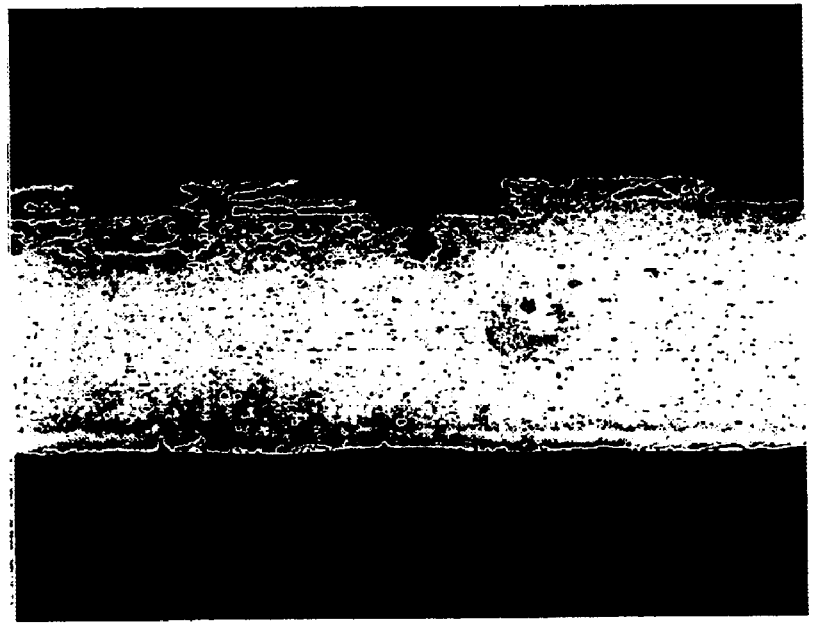

The pre-braze (O-temper) microstructure and grain structure of the braze sheet are shown in FIGS. 1 and 2. The grain size in O-temper is characterized by ASTM grain size no.5. Post-braze metallographic observations indicating the extent of core erosion in various samples are shown in FIGS. 3 and 4. The braze flow and core erosion results are listed in Table 2. These data are also shown as a plot in FIG. 5. From these results, the core erosion can be noted to be negligible (<<7%) at all levels of prior stretch.

The SWAAT corrosion life data are listed in Table 3. The average SWAAT life of coupons without any stretch prior to brazing is 332 hours. The SWAAT life of coupons stretched to different levels up to 10% is either similar to or better than that of coupons without any prior stretch. The SWAAT corrosion damage in various samples is illustrated in FIGS. 7–11. The lateral mode of corrosive attack that seems to begin at the surface is not sustained and the mode changes to localized type in all coupons. Note that there is often variation in SWAAT data and SWAAT life of materials of the present invention would be expected to be up to 1200 hours in many cases.

TABLE 3

SWAAT Life Data

| % Stretch prior to brazing | Specimen # | SWAAT hours A side | SWAAT hours B side | Average | Overall average |
|---|---|---|---|---|---|
| 0 | 1 | 360 | 528 | 444 | 332 |
| | 2 | 312 | 312 | 312 | |
| | 3 | 288 | 336 | 312 | |
| | 4 | 312 | 288 | 300 | |
| | 5 | 312 | 288 | 300 | |
| | 6 | 288 | 360 | 324 | |
| 2.5 | 1 | 360 | 360 | 360 | 450 |
| | 2 | 600 | 480 | 540 | |
| 5.0 | 1 | 312 | 312 | 312 | 366 |
| | 2 | 408 | 432 | 420 | |
| 7.5 | 1 | 288 | 288 | 288 | 360 |
| | 2 | 480 | 384 | 432 | |
| 10.0 | 1 | 288 | 312 | 300 | 528+ |
| | 2 | 696+ | 696+ | 696+ | |

+did not fail

Example 2

A clad material was prepared as follow:

| | | Chemical Composition (weight percent) | | | | | | |
|---|---|---|---|---|---|---|---|---|
| Alloy | | Si | Fe | Ca | Mn | Mg | Zn | Ti |
| Clad Alloy | 4045 | 9.1–10.1 | 0.30 max. | 0.10 max. | 0.05 max. | 0.05 max. | 0.10 max. | 0.10 max. |
| Core Alloy | | 0.15 max. | 0.25 max. | 0.40–0.6 | 1.0–1.3 | 0.05 max. | 0.10 max. | 0.10 max. |
| Clad Alloy | | 9.1–10.1 | 0.30 max. | 0.10 max. | 0.05 max. | 0.05 max. | 0.9–1.2 | 0.10 max. |

| | | Mechanical Properties (typical properties) | | |
|---|---|---|---|---|
| Condition | Ultimate Strength | Yield Strength | Elongation | Other Properties |
| O Temper | 124–166 MPa | 41 MPa | 20% | 8–12% clad each side |

Data in terms of corrosion potential, SWAAT data, tensile properties, % stretch vs. % braze flow, and micrographs at various stretch percentages associated with the above material are shown in FIGS. 13–19. Tests on the above material of Example 2 were conducted according to standard techniques and according to the same methodology as used for the same tests discussed in Example 1.

Example 3

Comparison

Vacuum brazing samples of −O temper brazing sheet which had been tensile stretched in amounts varying from 0–15% before brazing can be produced as disclosed by Ralph A. Woods in "Liquid Film Migration During Aluminum Brazing" pp. 639–648, published by the Kaiser Aluminum & Chemical Company, document no. 971848, the content of which is incorporated herein by reference.

Tensile coupons are cut from the annealed sheet and given a carefully controlled stretch in a conventional tensile testing machine while monitoring the separation of previously scribed gage marks. Brazing coupons measuring 50 mm×25 mm were cut from the center position of the gage length and were brazed in a 3-chamber laboratory furnace, typically ramping up to 590 degrees C. in 20 minutes, holding at temperature for 3 minutes, followed by a relatively fast cool. The samples were suspended vertically during brazing so that liquid braze metal could drain down the samples to accumulate at the lower strip edge. In order to study the progression of this effect, a technique of "interrupted melting" was developed. In this the brazing cycle was terminated when clad melting progressed about ½ way along the specimen length. Subsequent metallographic examination allows the study of onset and progress of LFM.

Results of these tests on these materials are set forth in FIGS. 20–27.

Example 4

Figure 28:
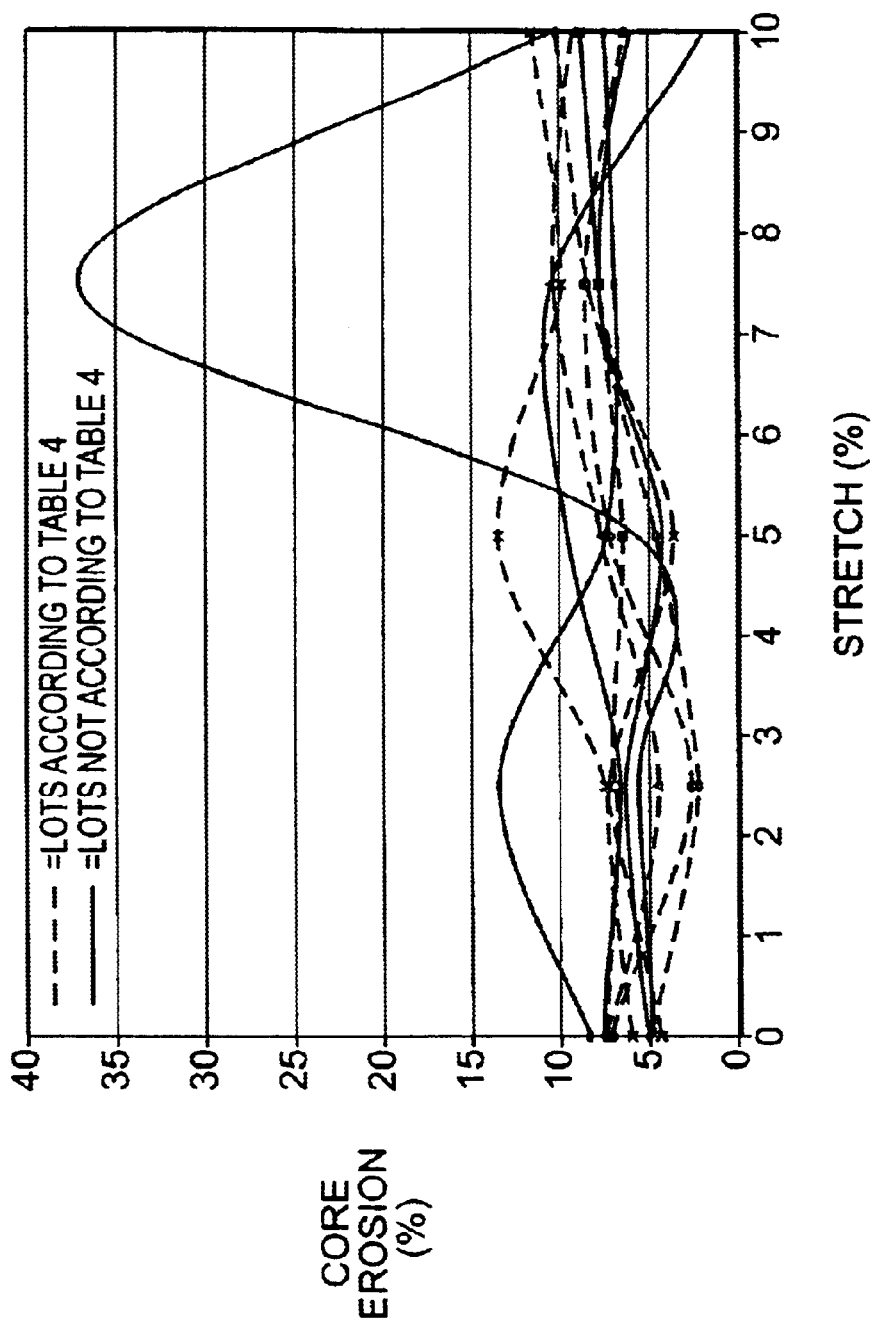
FIG. 28 is a graph showing core erosion as a function of stretch prior to brazing.
Figure 29:
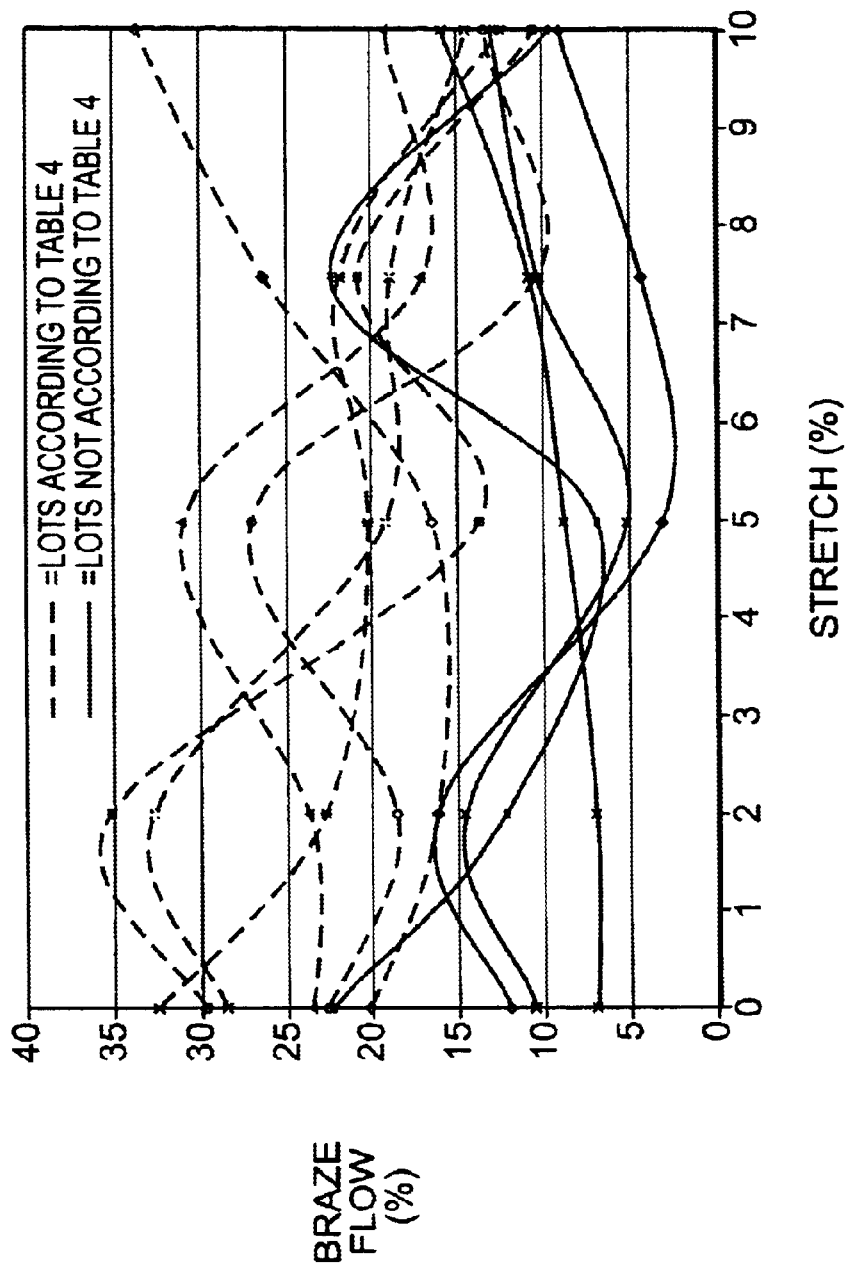
FIG. 29 is a graph showing braze flow as a function of stretch prior to brazing.

Table 4 lists process parameters that various lots listed in Tables 5 and 6 below were subjected to. The materials of Tables 5 and 6 were processed according to parameters indicated in Table 4 (those labeled "inv.") or with a process characterized process conditions, and in particular pre-heat times, that were different than those set forth in Table 4 (those labeled "non-inv."). The lots were otherwise planned according to an identical process. The invention lots are specified in Tables 5 or 6 and exhibit an unrecrystallized layer. As indicated in Table 6 these lots also display unexpectedly good braze flow and core erosion performance characteristics of this microstructural feature. Moreover, the braze flow performance of the invention lots (see FIG. 29) is significantly higher on average than that of the non-invention lots at all levels of stretch prior to brazing. For example, as shown in FIG. 29, the braze flow is typically 25% higher when the uncrystallized layer is formed. The unexpectedly superior core erosion of the invention lots is illustrated in FIG. 28 which also demonstrates that the non-invention lots can show erratic behavior in terms of core erosion as a function of stretch. This is typically undesirable for use in the automotive industry as well as other industries that require materials that possess low core erosion properties. That is, core erosion should preferably be consistent over virtually any degree of stretch up to at least 10% stretch. Core erosion of the inventive sheets or plates during a brazing cycle, as measured in a cross-sectional optical microscopy subsequent to the brazing cycle, is preferably less than 20%, advantageously less than 10%.

TABLE 4

| Parameter | Process details (inv) |
| --- | --- |
| Composite | 2-side clad 0.0157" plate |
| Core pre-heat | 10 h at 980–1030° F. (526.7–554.4° C.) |
| Composite pre-heat | <30 h at 880–930° F. (471.1–498.9° C.) |
| Hot line exit gauge/temp | 0.110" (2.8 mm) |
| 381 exit gauge (final gauge) | .0157" (0.40 mm) |
| Anneal | Full anneal |

TABLE 5

Chemistry and pre-braze tensile properties of lots A–J

| Reference | Process | URL | Pre-braze YS ksi | Pre-braze UTS ksi | Pre-braze % El % | Si wt % | Fe wt % | Cu wt % | Mn wt % | Mg wt % |
| --- | --- | --- | --- | --- | --- | --- | --- | --- | --- | --- |
| A | Inv | Yes | 9.1 | 20.7 | 26.3 | 0.07 | 0.18 | 0.43 | 1.17 | 0.002 |
| B | Inv | Yes | 8.3 | 19.9 | 26.6 | 0.05 | 0.17 | 0.48 | 1.12 | 0.001 |
| C | Inv | Yes | 8.2 | 20.2 | 27.5 | 0.05 | 0.16 | 0.48 | 1.23 | 0.001 |
| D | Inv | Yes | 8.6 | 20.1 | 26.6 | 0.05 | 0.17 | 0.48 | 1.12 | 0.001 |
| E | Inv | Yes | 8.4 | 20.0 | 26.3 | 0.05 | 0.16 | 0.48 | 1.23 | 0.001 |
| F | Inv | Yes | 8.6 | 20.2 | 27.2 | 0.05 | 0.16 | 0.48 | 1.23 | 0.001 |
| G | non-inv | No | 8.9 | 20.1 | 28.1 | 0.05 | 0.16 | 0.48 | 1.23 | 0.001 |
| H | non-inv | No | 8.3 | 19.6 | 27.7 | 0.05 | 0.17 | 0.48 | 1.12 | 0.001 |
| I | non-inv | No | 8.1 | 19.3 | 28.6 | 0.05 | 0.17 | 0.48 | 1.12 | 0.001 |
| J | non-inv | No | 8.3 | 19.6 | 21.0 | 0.07 | 0.23 | 0.42 | 1.13 | 0.001 |

TABLE 6

Performance during brazing of lots A–J

| Reference | Process | BF 0% Stretch % | BF 2.5% Stretch % | BF 5% Stretch % | BF 7.5% Stretch % | BF 10% Stretch % | CE 0% stretch % | CE 2.5% stretch % | CE 5% stretch % | CE 7.5% stretch % | CE 10% stretch % |
|---|---|---|---|---|---|---|---|---|---|---|---|
| A | Inv | 40.3 | 32.6 | 33.2 | 52.7 | 67.3 | 5 | 2.4 | 4.8 | 8.6 | 10.3 |
| B | Inv | 59.3 | 70.3 | 27.7 | 41.5 | 21 | 7.4 | 7.6 | 13.6 | 10.2 | 11.7 |
| C | inv | 46.8 | 47.5 | 62 | 34.3 | 38.5 | 7.3 | 4.7 | 7.8 | 10.5 | 9.5 |
| D | inv | 57.1 | 65.2 | 38.8 | 38.1 | 29.2 | 4.5 | 7.1 | 6.6 | 8 | 9 |
| E | inv | 64.7 | 45.6 | 40.4 | 44.1 | 25.2 | 6.1 | 7.4 | 3.8 | 8.6 | 6.3 |
| F | inv | 45.3 | 37.3 | 54.3 | 21.1 | 27.2 | 7.4 | 2.7 | 7.4 | 8.7 | 6.6 |
| G | non-inv | 13.7 | 14 | 17.7 | 21.8 | 31.7 | 7.8 | 6.8 | 9.7 | 10.6 | 2.1 |
| H | non-inv | 24 | 32.4 | 6.2 | 8.9 | 18.3 | 5.2 | 6.4 | 4.4 | 8 | 6.7 |
| I | non-inv | 20.7 | 29.2 | 10.4 | 20.8 | 26.1 | 8.4 | 13.6 | 7.6 | 7.1 | 7.7 |
| J | non-inv | 45.2 | 24.3 | 13.9 | 44.9 | 19.5 | 4.9 | 5.8 | 5.8 | 37.3 | 10.7 |

BF = Braze Flow
CE = Core Erosion

As used herein and in the following claims, articles such as "the", "a" and "an" can connote the singular or plural.

All documents referred to herein are specifically incorporated herein by reference in their entireties.

Additional advantages, features and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

We claim:

1. An aluminum sheet or plate wherein the aluminum sheet or plate is clad on one or both sides and the discrete unrecrystallized layer forms at a boundary between the clad and the core.

2. An aluminum sheet or plate according to claim 1, wherein said layer has a thickness of at least 5 microns at all points, and said layer comprises up to 20% by volume of said sheet or plate.

3. An aluminum sheet or plate according to claim 2, wherein said layer comprises less than 10% by volume of said sheet or plate.

4. An aluminum sheet or plate according to claim 2, wherein said layer comprises less than 5% by volume of said sheet or plate.

5. An aluminum sheet or plate of claim 1, wherein said sheet or plate comprises Cu in an amount of at least 0.1% based on the weight of the sheet or plate.

6. An aluminum sheet or plate of claim 1, wherein the at least one of the core or the clad comprises manganese in an amount greater than 0.5% by weight, based on the weight thereof.

7. An aluminum sheet or plate of claim 1 wherein the core comprises Si in trace amounts up to 1.0% based on the weight of the core.

8. An aluminum sheet or plate of claim 1, wherein the core comprises Si from 0.1–1.0%, Cu in an amount greater than 0.1%, and Mn in an amount of at least 0.5%, each weight being based on the weight of the core.

9. An aluminum sheet or plate of claim 1, wherein the clad includes Si in an amount from 1–13% based on the weight of the clad.

10. An evaporator plate comprising an aluminum sheet or plate according to claim 1.

11. An aluminum sheet or plate according to claim 1 for which core erosion during a brazing cycle, as measured in a cross-sectional optical microscopy subsequent to the brazing cycle, is less than 20%.

12. An aluminum sheet or plate according to claim 11, wherein the core erosion is less than 10%.

13. An aluminum sheet or plate according to claim 1, that has been formed by a process comprising: casting an ingot, optionally partially homogenizing said ingot, cooling said ingot, subjecting said ingot to machine and/or scalping treatments, optionally applying a cladding to one or both sides of said ingot, preheating said ingot to a temperature of from 850–1075 degrees F. (454.4–579.4° C.).

14. An aluminum sheet or plate comprising a core and at least one clad, wherein a continuous or a substantially continuous unrecrystallized layer is provided between said core and said clad.

15. An aluminum sheet or plate according to claim 14, wherein said layer is at a boundary between the core and clad.

16. An aluminum sheet or plate according to claim 14, wherein the layer is at least 5 microns in thickness.

17. An aluminum sheet or plate according to claim 14, wherein the layer comprises less than 20% of the thickness of the core.

18. An aluminum sheet or plate according to claim 17, wherein the layer comprises less than 10% of the thickness of the core.

19. An aluminum sheet or plate according to claim 17, wherein the layer comprises less than 5% of the thickness of the core.

20. An aluminum sheet or plate according to claim 14 comprising Mn from 0.5 to 2.0% based on the weight or the sheet or plate in the case of unclad materials and based on the weight of the core in the case of clad materials.

21. An aluminum sheet or plate according to claim 20, comprising Mn from 0.8–1.5%.

22. An aluminum sheet or plate of claim 1, wherein said discrete layer comprises abutting and/or overlapping elongated unrecrystallized grains.

* * * * *